United States Patent
Muthurajan et al.

(10) Patent No.: US 11,178,706 B2
(45) Date of Patent: Nov. 16, 2021

(54) JUST IN TIME CONNECTION CONFIGURATION STORED IN SIM PROFILE

(71) Applicant: MICROSOFT TECHNOLOGY LICENSING, LLC, Redmond, WA (US)

(72) Inventors: Anand Muthurajan, Redmond, WA (US); Wael Jendli, Kirkland, WA (US); Sohail A. Hirani, Redmond, WA (US); John David Bruner, Redmond, WA (US); Jean Khawand, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 82 days.

(21) Appl. No.: 16/775,735

(22) Filed: Jan. 29, 2020

(65) Prior Publication Data
US 2021/0235515 A1   Jul. 29, 2021

(51) Int. Cl.
*H04W 76/10*     (2018.01)
*H04W 8/22*      (2009.01)

(52) U.S. Cl.
CPC .............. *H04W 76/10* (2018.02); *H04W 8/22* (2013.01)

(58) Field of Classification Search
CPC ................................ H04W 76/10; H04W 8/22
See application file for complete search history.

(56) References Cited

U.S. PATENT DOCUMENTS

| 2009/0124263 A1* | 5/2009 | Wirtl | H04L 12/5692 |
| | | | 455/445 |
| 2013/0031258 A1* | 1/2013 | Mukai | H04L 12/6418 |
| | | | 709/227 |

OTHER PUBLICATIONS

"3 Generation Partnership Project; Technical Specification Group Core Network and Terminals; Characteristics of the Universal Subscriber Identity Module application", In the Technical Report 3GPP TS 31.102 V16.2.0, Jan. 8, 2020, pp. 1-321.
"3 Generation Partnership Project; Technical Specification Group Services and System Aspects; General Packet Radio Service enhancements for Evolved Universal Terrestrial Radio Access Network access", In the Technical Report 3GPP TS 23.401 V16.5.0, Dec. 22, 2019, pp. 1-436.

(Continued)

*Primary Examiner* — Joseph E Dean, Jr.
(74) *Attorney, Agent, or Firm* — Newport IP, LLC; Jacob P. Rohwer

(57) ABSTRACT

Connection settings used by a mobile device to connect to a packet data network, e.g. the internet, are stored in a subscriber identity module (SIM) card. This enables connection settings to be pre-loaded on a SIM card, allowing a mobile device to immediately connect to the internet without manual configuration. The mobile device's connection settings may also be updated by a mobile network operator via an over the air profile update. For example, the operator may supply a device with connection settings the first time it connects to the network. Connection settings may be stored in one or more files within the SIM profile, and may be updated via a remote file management operation. Embedded-SIM (eSIM) profiles may also store connection settings in profile metadata, which may be updated via a metadata update operation.

20 Claims, 22 Drawing Sheets

(56) References Cited

OTHER PUBLICATIONS

"3 Generation Partnership Project; Technical Specification Group Services and System Aspects; Study of need for multiple Access Point Names", In the Technical Report 3GPP TR 22.802 V14.0.0, Jun. 30, 2015, pp. 1-19.

"EUICC Profile Package: Interoperable Format Technical Specification", In the Publication of simalliance Version 2.2, Sep. 10, 2018, 106 Pages.

"International Search Report and Written Opinion Issued in PCT Application No. PCT/US20/064741", dated Mar. 31, 2021, 20 pages.

"Remote Provisioning Architecture for Embedded UICC", In the Technical Report GSM Association Official Document SGP.02-1, Version 4.0, Feb. 25, 2019, pp. 1-399.

* cited by examiner

JUST IN TIME CONNECTION CONFIGURATION STORED IN SIM PROFILE

BACKGROUND

Packet data networks ("packet networks"), such as the internet, enable mobile devices to send and receive messages, download and run applications, stream music, share photos, etc. However, existing techniques for connecting a mobile device to a packet network have a number of drawbacks. For example, if a mobile device is not connected to the internet, a user may have to manually enter a connection setting for a packet data gateway in order to get online.

Another problem is that network operators (e.g. Verizon®) cannot quickly change which gateway a mobile device uses to connect to a packet network. If the mobile device is connected to the internet via a general-purpose internet gateway, but Verizon wants to move the device to a low-latency internet gateway, Verizon may have to put in a change request to the device's operating system (OS) vendor. It could take weeks or even months for the OS vendor to issue an update that moves the device to the low-latency gateway. In the meantime, the mobile device may operate slower, consume more battery life, and otherwise operate less efficiently. Users may lose patience waiting for the change and resort to manually entering a connection setting for the low-latency gateway. In addition to the hassle, user-input is error prone and a frequent cause of security vulnerabilities.

Another downside to distributing connection settings changes via OS updates is an increase in how many OS updates a device applies. Specifically, in order to update connection settings, some devices may apply an OS update that would otherwise be unnecessary. OS updates require significant network bandwidth and storage to distribute. These costs may be particularly burdensome for internet of things (IoT) devices and other devices that have limited storage and/or rely on expensive cellular connectivity to receive OS updates. As such, distributing connection settings via OS updates can impose a significant resource and financial cost on end users.

Another challenge facing operators are complex, inefficient routing topologies used when a mobile device is roaming. For example, when a mobile device leaves its home network for a visited network, internet connections may be routed from the visited network to the home network and back to the visited network. These additional hops may add significantly to connection latency and expense.

It is with respect to these and other technical challenges that the disclosure made herein is presented. The subject matter claimed herein is not limited to embodiments that solve any disadvantages or that operate only in environments such as those described above. Rather, this background is only provided to illustrate one exemplary technology area where some embodiments described herein may be practiced.

SUMMARY

The techniques discussed herein address the aforementioned problems by storing connection settings in a subscriber identity module (SIM) card. In one configuration, a SIM card may be pre-loaded from the factory with connection settings. A SIM card with a pre-loaded connection setting can be inserted into a device and used to connect to the internet without further configuration. For example, a user does not have to manually enter a connection setting or use a Wi-Fi connection to download a connection setting in order to access the internet. Storing connection settings in the SIM card also enables connection settings to be updated in real-time via over the air updates. Over the air updates enable operators to quickly and seamlessly move a mobile device to a different gateway. Operators may move a mobile device to a different gateway in order to reduce connection latency, increase security, increase throughput, switch to a different packet network, and provide other technological benefits described herein.

In some configurations, over the air updates allow an operator to optimize how roaming devices connect to visited networks. For example, Verizon may supply a device that is roaming on the T-Mobile® network with connection settings specific to T-Mobile. Specifically, the T-Mobile specific connection settings may allow the mobile device to route a connection directly through a T-Mobile gateway to the destination network, without first being routed to and from the Verizon network.

When establishing a connection to a packet network, a mobile device may select a connection setting stored locally in the SIM profile based on the type of connection being established, and when applicable, the visited network that the device is currently connected to. For example, when creating a connection to the internet, a mobile device may query the available connection settings for a connection type of "internet". Other connection types include voice over internet protocol (VoIP), internet media services (IMS), operator provisioning, etc.

Once a connection setting has been selected, the mobile device uses connection properties from the connection setting to establish the connection. Connection properties may include a connection name, whether to connect using IPv4 or IPv6, whether the connection will use a proxy, whether the connection requires a secondary authentication protocol, etc.

The connection name property identifies a gateway hosted by the mobile network that acts as a boundary between the mobile network and a packet network. A gateway may translate and forward packets between the two networks, or in the case of a circuit switched mobile network, tunnel the packet network to the mobile device. When establishing the connection, the mobile device provides the connection name to the mobile network. For example, a connection setting of type "internet" may have a connection name of "vzwinternet". By supplying "vzwinternet" when establishing the connection, the mobile device will connect to the internet via the "vzwinternet" gateway.

In some configurations, an operator may establish multiple gateways that connect to the same packet network. Different gateways may provide different qualities of service (QoS) to the same packet network. For example, Verizon may establish the connection name "lowlatencyvzwinternet" for connections given higher priority access to the public internet than connections made through the "vzwinternet" gateway.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The techniques described herein may be implemented for devices in communication with various wireless communications systems such as CDMA, TDMA, FDMA, OFDMA, and SC-FDMA. A CDMA system may implement a radio technology such as CDMA2000, Universal Terrestrial Radio Access (UTRA), etc. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. The techniques described herein may be used for the systems and radio technologies mentioned above as well as other systems and radio technologies. The description below, however, describes a cellular system for purposes of example, although the techniques are applicable beyond cellular applications.

Figure 1:
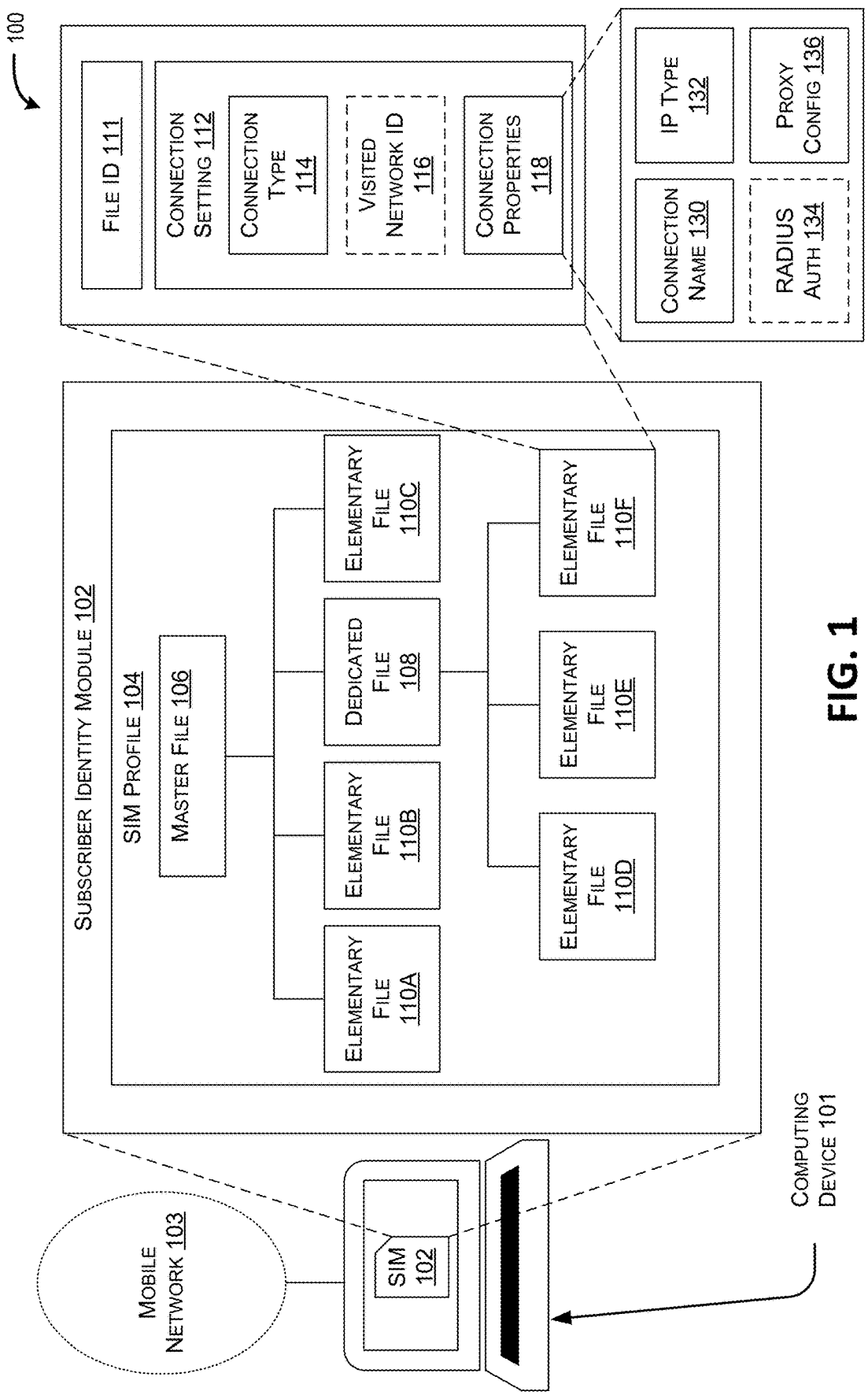
FIG. 1 is a block diagram illustrating an example of a SIM profile that stores a connection setting in an elementary file, according to one embodiment.

FIG. 1 is a block diagram 100 illustrating an example of a SIM profile 104 that stores a connection setting 112 in an elementary file 110. SIM profile 104 may be stored on SIM card 102, also referred to as a universal integrated circuit card (UICC). SIM card 102 may be a removable card capable of being moved from device to device, but as discussed below in conjunction with FIG. 2, similar techniques may be applied to files stored in an eSIM profile.

SIM card 102 may be communicatively coupled with computing device 101, enabling computing device 101 to connect to a mobile network 103. SIM profile 104 may be associated with a profile ID that uniquely identifies SIM card 102 on the mobile network 103. In some configurations, SIM profile 104 includes a file structure, e.g. master file 106 is a parent file of one or more sub files such as elementary files 110A-110C. Master file 106 may also be the parent of dedicated file 108, which may operate as a directory containing elementary files 110D-110F.

In some configurations, one or more files having a known file ID 111 may contain one or more connection settings 112. While FIG. 1 depicts one connection setting per file, it is similarly contemplated that one or more files may each contain one or more connection settings. In some configurations, elementary files 110 containing connection settings may be grouped within a particular dedicated file 108. When initiating a connection, computing device 101 may query SIM profile 104 for dedicated files 108 and/or elementary files 110 that have a file ID known to be associated with connection settings.

In some embodiments, connection setting 112 includes connection type 114, connection properties 118, and optionally a visited network ID 116. Connection properties 118 may include connection name 130, IP type 132, proxy configuration 136, and optionally RADIUS authentication 134. Connection type 114 may indicate whether the connection setting is used for an internet connection, internet protocol (IP) multimedia system (IMS), VoIP, provisioning, etc. Optional visited network identifier 116 may store an identifier of a network, enabling different connection settings to be applied to different operators. Connection name 130 may refer to any type of gateway identifier, such as access point name (APN), data network name (DNN) or slice ID.

In some configurations, an operator adds one or more connection settings to a SIM profile before the SIM card is obtained by an end user. For example, an operator may add one or more connection settings to the SIM profile when the SIM is being manufactured. Once a SIM card storing a pre-loaded connection setting is inserted into a mobile device, the device is capable of connecting to the internet via the operator without additional setup such as manually entering connection settings or retrieving connection settings via Wi-Fi.

In addition to pre-loading connection settings, storing connection settings in a SIM profile gives control to the operator to manage how devices connect to different packet data networks. For example, an operator may use the ability to configure individual mobile devices to achieve load-balancing—e.g. by spreading out connections over a number of different gateways, and/or by limiting the number of devices that rout connection requests to a particular gateway.

Another scenario enabled by the disclosed embodiments is to allow a mobile device 101 to be reconfigured to use a different operator. For example, if a device is shipped with a SIM that targets a first operator, but that operator is subject to a merger, or goes out of business, or if the first operator was spun off into a mobile virtual mobile network operator (VNMO), then giving control to the operator to configure connection settings 112 enables devices to be reprogrammed quickly to use the new operator's gateways.

Another scenario enabled by the disclosed embodiments allows an operator to offer access to the internet with different levels of QoS. For example, emergency rescue personnel may have access to a gateway that takes priority over internet connections. In some configurations, a particular gateway may have internet capacity (e.g. bandwidth, throughout, etc.) reserved. Operators may sell access to higher QoS internet access for a premium price, or lower QoS internet access at a discount. If a mobile subscriber subscribes to a premium plan entitled to higher QoS internet, then the next time a device associated with the subscriber connects to the mobile network, the operator may respond by updating the subscriber's connection settings to include the higher QoS gateway. When connection settings are stored in one or more files 110 in SIM profile 104, the operator may send one or more file update requests that add, update, or replace one or more connection settings 112. A remote file update operation may be performed via the short message service pencil and paper (SMSPP) protocol or a bearer independent protocol (BIP) session.

Another scenario enabled by the disclosed embodiments enables mobile devices to connect directly to a corporate network. In some configurations, the connection may be secured, e.g. by SSL or other encryption technology. In some embodiments, the mobile operator and the corporation may implement virtual private networking to extend the private corporate network to mobile devices. In some configurations, if a mobile device associated with a corporate network initiates a connection with the public internet, the mobile network may automatically respond by changing the device's connection settings to use a gateway that connects to the corporate network.

Computing device 101 may be any type of computing device capable of communicating with a mobile network, such as a cellular phone, smartphone, laptop computer, tablet computer, desktop computer, smart watch, augmented/virtual reality device, or the like. SIM profiles are used in this disclosure for brevity and clarity, but other profile types and other types of connection settings are similarly contemplated.

Figure 2:
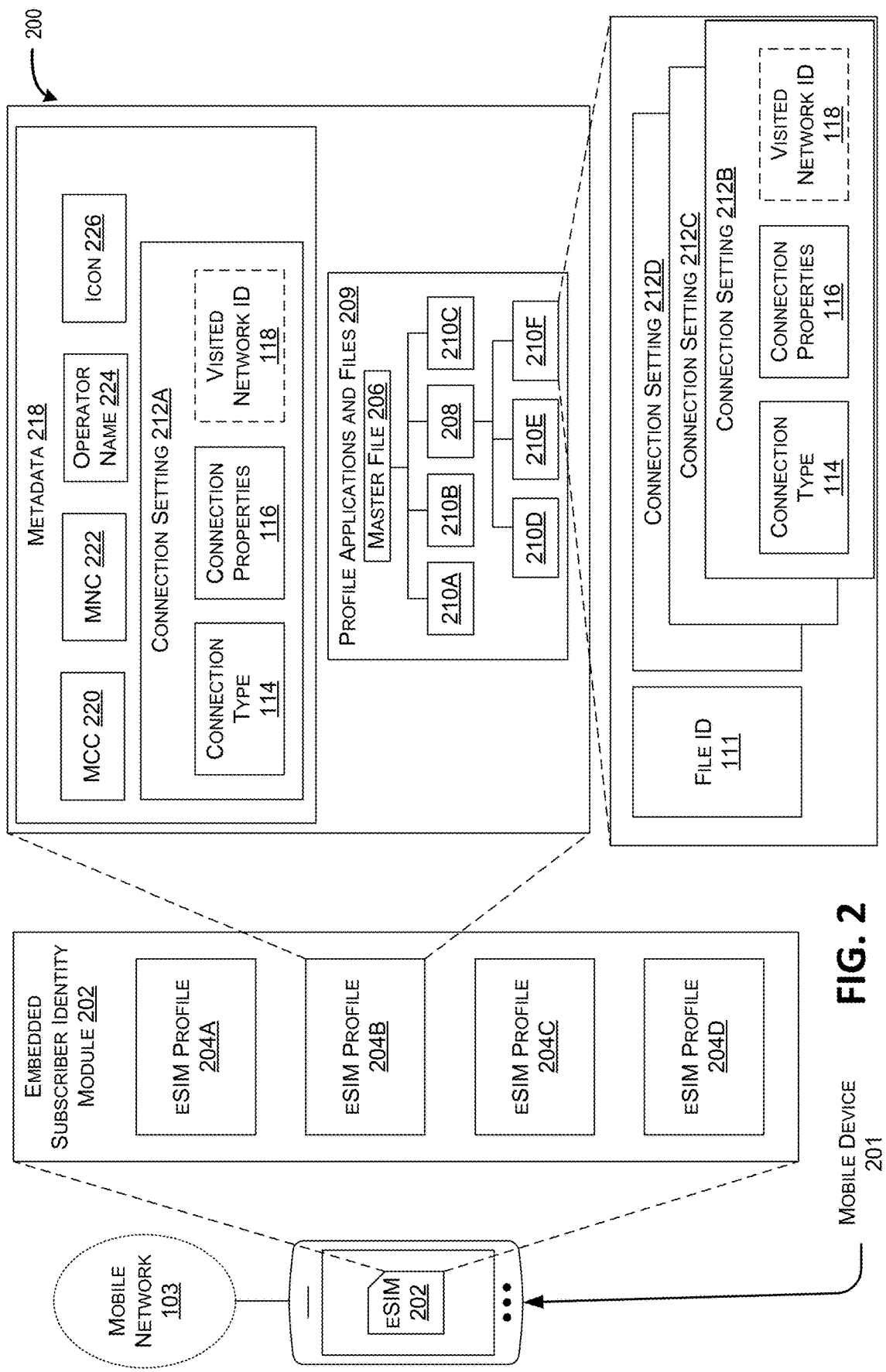
FIG. 2 is a block diagram illustrating an example of an embedded SIM (eSIM) profile that stores a connection setting in a connection setting file or a metadata entry, according to one embodiment.

FIG. 2 is a block diagram 200 illustrating an example of an eSIM profile 204B that stores a connection setting 212 in an elementary file 210 or in a metadata entry 218. In some configurations, eSIM profile 204B is one of a number of eSIM profiles 204 stored in eSIM 202, each profile 204 being associated with a different profile ID. eSIM profile 204B may include profile applications and files 209 that store data in a format and structure similar if not identical to the file structure stored in SIM profile 104. In addition, eSIM 202 includes metadata 218, which may store additional information related to mobile device 201, and which may be updated remotely by an operator via a remote profile modification (RPM) operation. Metadata 218 may store mobile country code (MCC) 120, mobile network code (MNC) 122, operator name 124, and icon 126 in addition to connection settings 212A.

ESIM profile 204B may store one or more connection settings 212 in different locations. For example, profile applications and files 209 may contain a tree of files similar if not identical to the structure of files stored in a SIM card as described above in conjunction with FIG. 1. Specifically, profile applications and files 209 may include a master file 206, which has one or more child elementary files 210. Elementary files 210 may be grouped by dedicated files 208, which act as a directory. One or more connection settings may be stored in each elementary file. As discussed above in conjunction with FIG. 1, Elementary files may be identified with a file ID 111, and particular file IDs 111 may be known to store connection settings 212.

ESIM profile 204B may also store one or more connection settings 212 directly in metadata 218. As depicted, connection setting 212A is included in metadata 218.

Connection settings 212, whether they are stored in an elementary file 210 or directly in metadata, may include connection type 114, connection properties 118, and optionally, visited network ID 116, consistent with connection settings 112 discussed above.

Figure 3A:
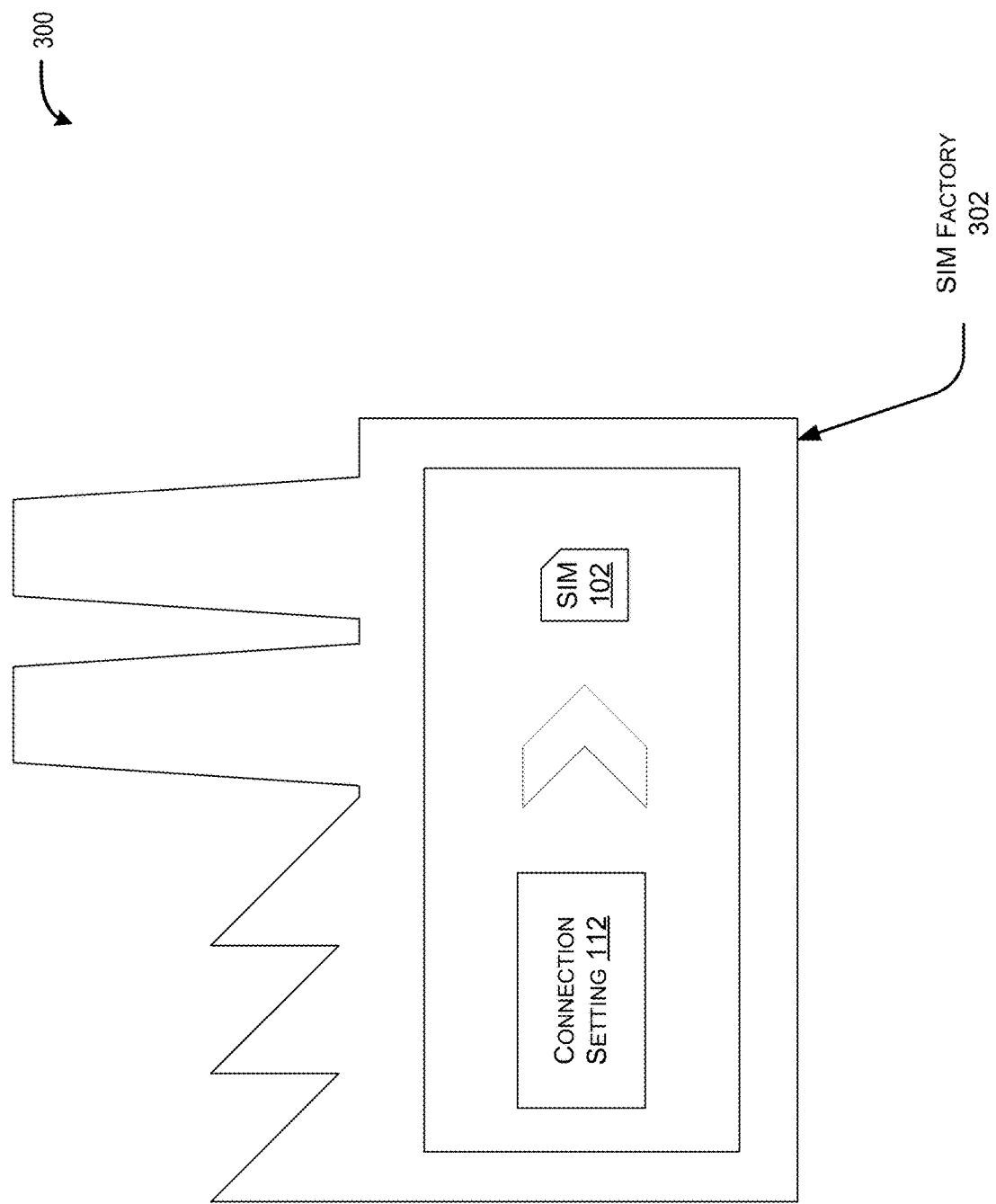
FIG. 3A is a block diagram illustrating an example environment for pre-configuring a SIM card with a connection setting, according to one embodiment.

FIG. 3A is a block diagram 300 illustrating an example environment for pre-configuring SIM card 102 with the connection setting 112. In some configurations, SIM card 102 is preconfigured with one more connection settings 112. SIM card 102 may be preconfigured at sim card factory 302, or by an operator before distributing the SIM card 102 to a customer for use.

SIM 102 may be pre-configured to include a connection setting 112, enabling mobile device 201 to connect to a mobile network 103 without Wi-Fi or other auxiliary connection medium. eSIM 202 may similarly be pre-configured at a factory 302 or by an operator before being distributed.

Figure 3B:
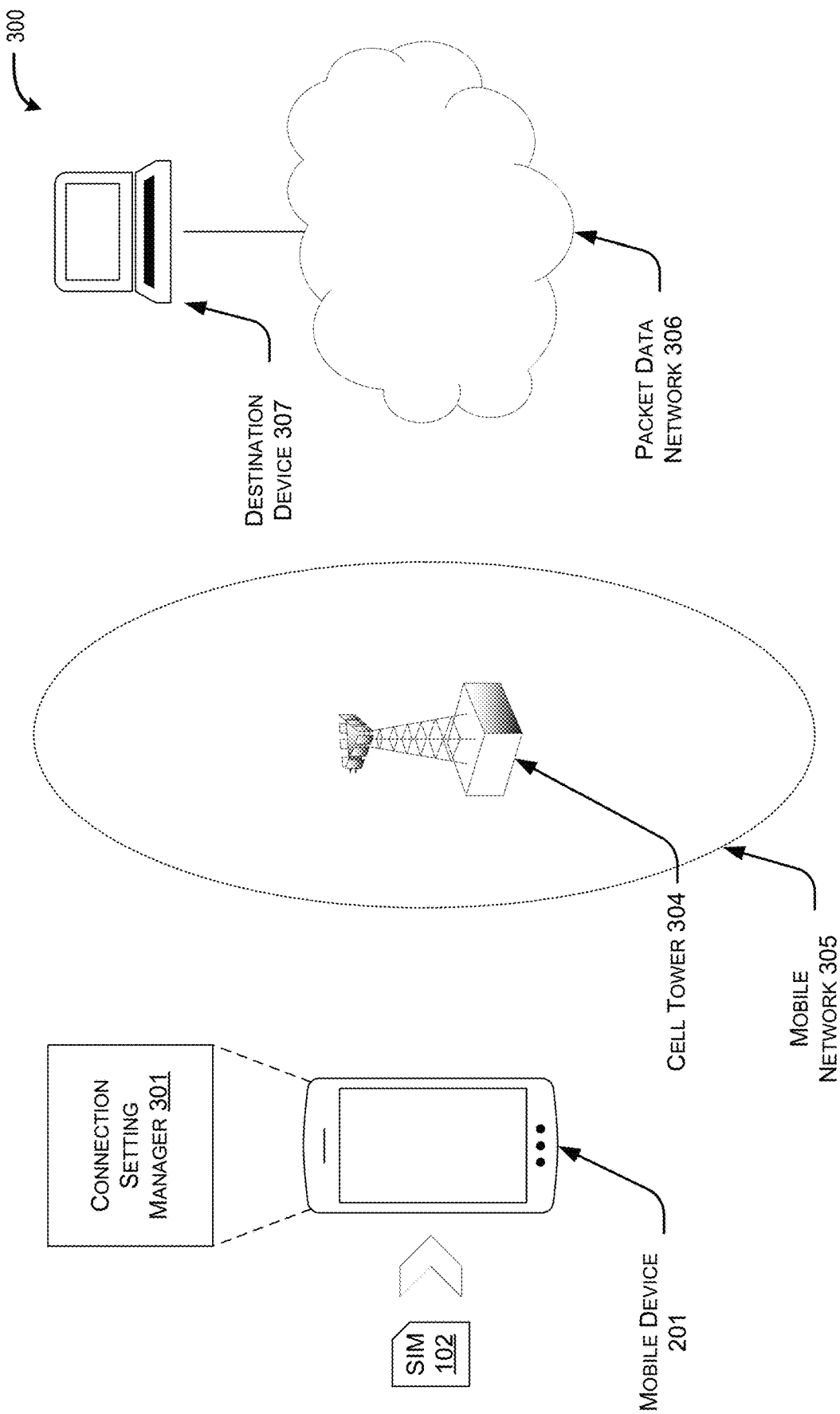
FIG. 3B is a block diagram illustrating inserting a SIM card into a mobile device, according to one embodiment.

FIG. 3B is a block diagram 300 illustrating inserting a SIM card 102 into a mobile device 201. Upon receiving SIM card 102, mobile device 201 may launch connection setting manager 301 to load, store, update, and delete connection settings from SIM profile 104. FIG. 3B also depicts cell tower 304 of mobile network 305, as well as packet data network 306 and destination device 307.

Figure 3C:
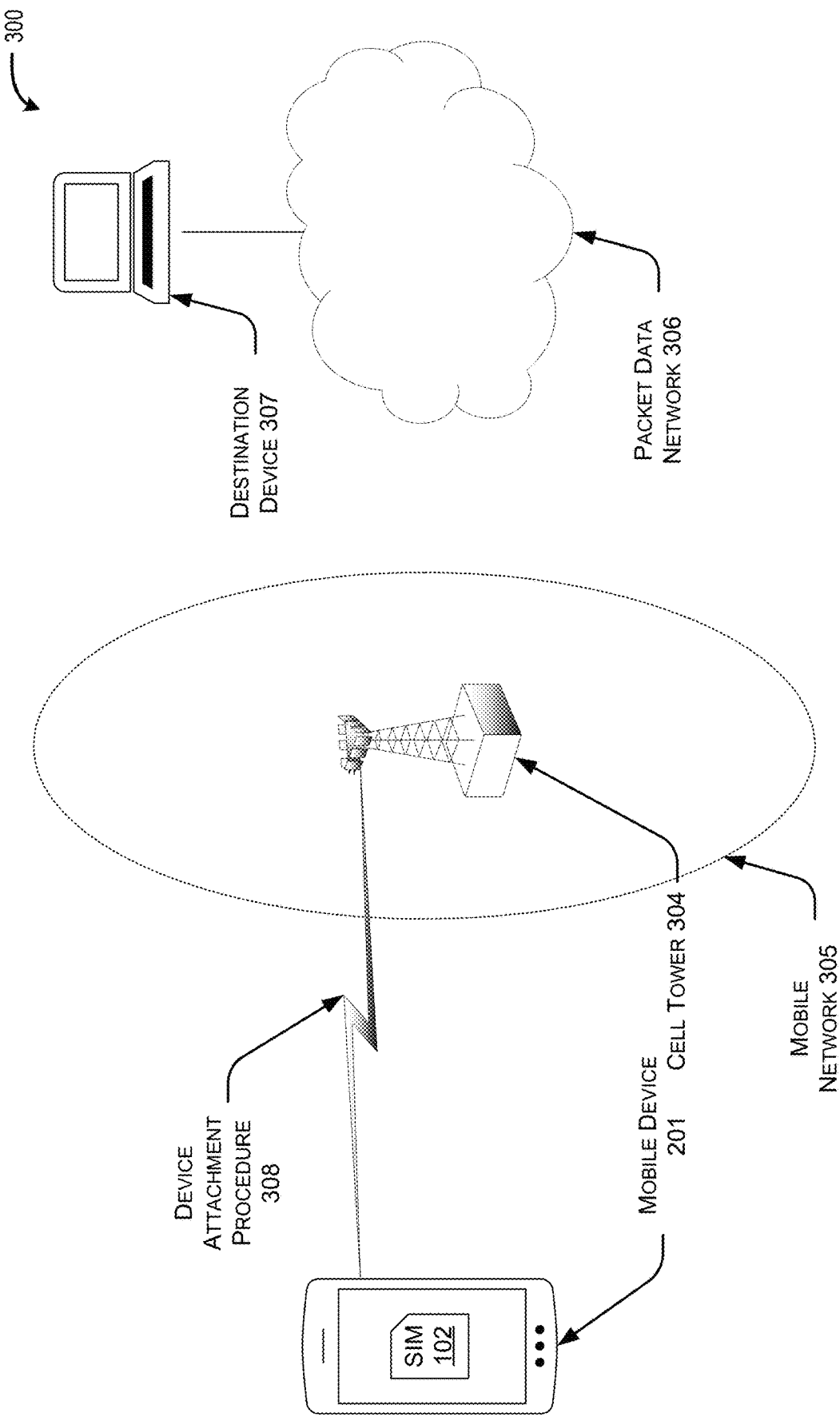
FIG. 3C is a block diagram illustrating a mobile device attachment procedure to a mobile network, according to one embodiment.

FIG. 3C is a block diagram 300 illustrating a mobile device attachment procedure 308 to a mobile network. In some configurations, attachment procedure 308 includes authenticating the identity of a user of mobile device 201. Attachment procedure 308 may also determine if a user's account is active, whether their bill is paid, or any other factor used to decide whether to allow mobile device 201 to connect to mobile network 305. "Attachment procedure" is synonymous with "registration procedure", and an "attached mobile device" is synonymous with a "registered mobile device". In some configurations, after registering with mobile network 305, mobile device 201 may utilize a pre-loaded connection setting 112 to establish a network connection with mobile network 305. This connection setting 112 may have been pre-loaded at the factory or by the operator. As described in more detail below, mobile network 305 may utilize the connection to providing an updated connection setting 112 to mobile device 201.

Figure 3D:
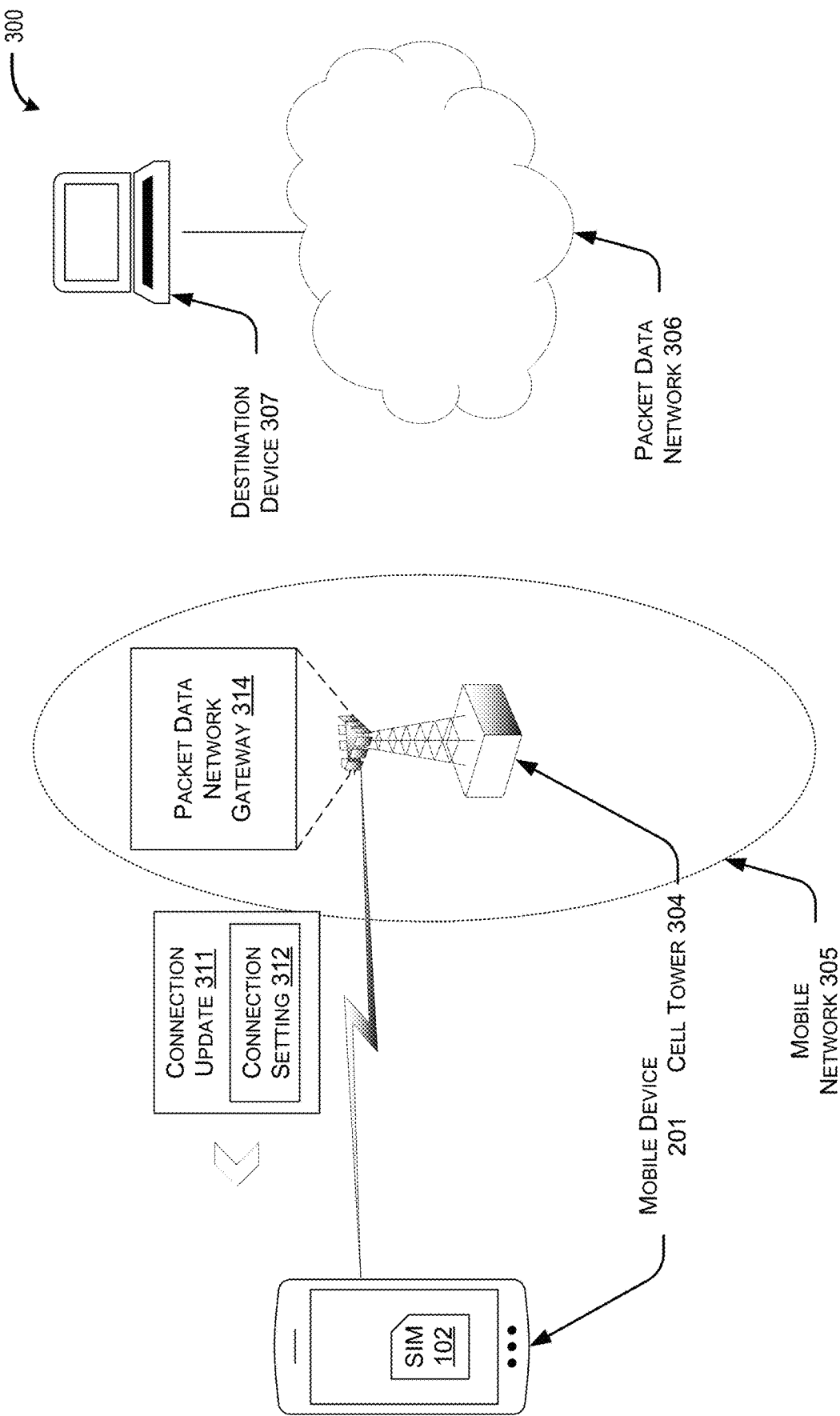
FIG. 3D is a block diagram illustrating a connection setting update being sent from a mobile network to a mobile device in response to the mobile device registering with the mobile network, according to one embodiment.

FIG. 3D is a block diagram 300 illustrating cell tower 304 of mobile network 305 sending a connection setting update 311 to mobile device 201. In some configurations, connection setting update 311 is sent response to mobile device 201 establishing a network connection with a stale or outdated connection setting 112. In other configurations, connection setting update 311 is sent when the operator of mobile network 305 has changed, e.g. if the mobile network has merged with another operator or become a virtual mobile network operator (VMNO). In yet another configuration, mobile network 305 sends connection setting update 311 if SIM 102 has been inserted into a different type of computing device and the operator uses different gateways for different device types. In some configurations, updated connection setting 312 is sent as part of connection update 311.

Mobile network 305 provides an updated configuration setting 312 to mobile device 201 soon after mobile network 305 determines that the operator and/or a subscriber associated with mobile device 201 would benefit from using a different gateway.

In some configurations, mobile device 201 may store updated connection setting 312 in a SIM profile 104, e.g. as one of a number of connection settings 112 stored in an elementary file 110 that is part of SIM profile 104, or as part of metadata 218 of an eSIM profile. In this way, mobile device 201 can leverage updated connection setting 312 the next time mobile device 201 connects to a packet data network (PDN).

Figure 3E:
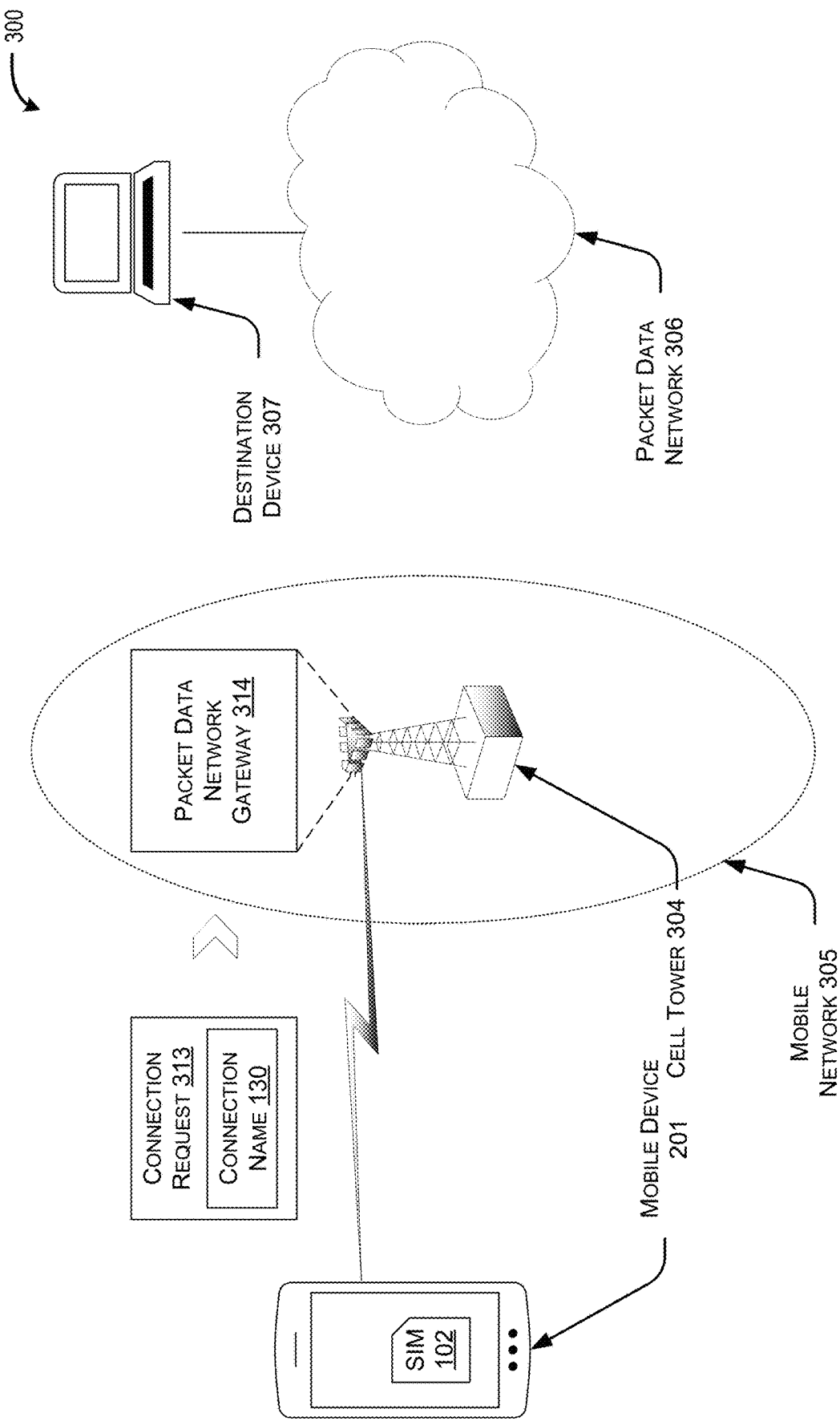
FIG. 3E is a block diagram illustrating a connection request used to connect to a packet data network, according to one embodiment.

FIG. 3E is a block diagram 300 illustrating a connection request 313 used to connect to packet data network 306. In one configuration, connection request 313 includes updated connection name 130, which was selected by mobile network 305 and provided to mobile device 201 in connection update 311. Connection name 130 identifies a gateway used to connect to a PDN. Connection name 130 may be any type of identifier, but is commonly a series of characters defined by an operator to refer to a particular PDN gateway, such as "vzwinternet" or "voip".

Figure 3F:
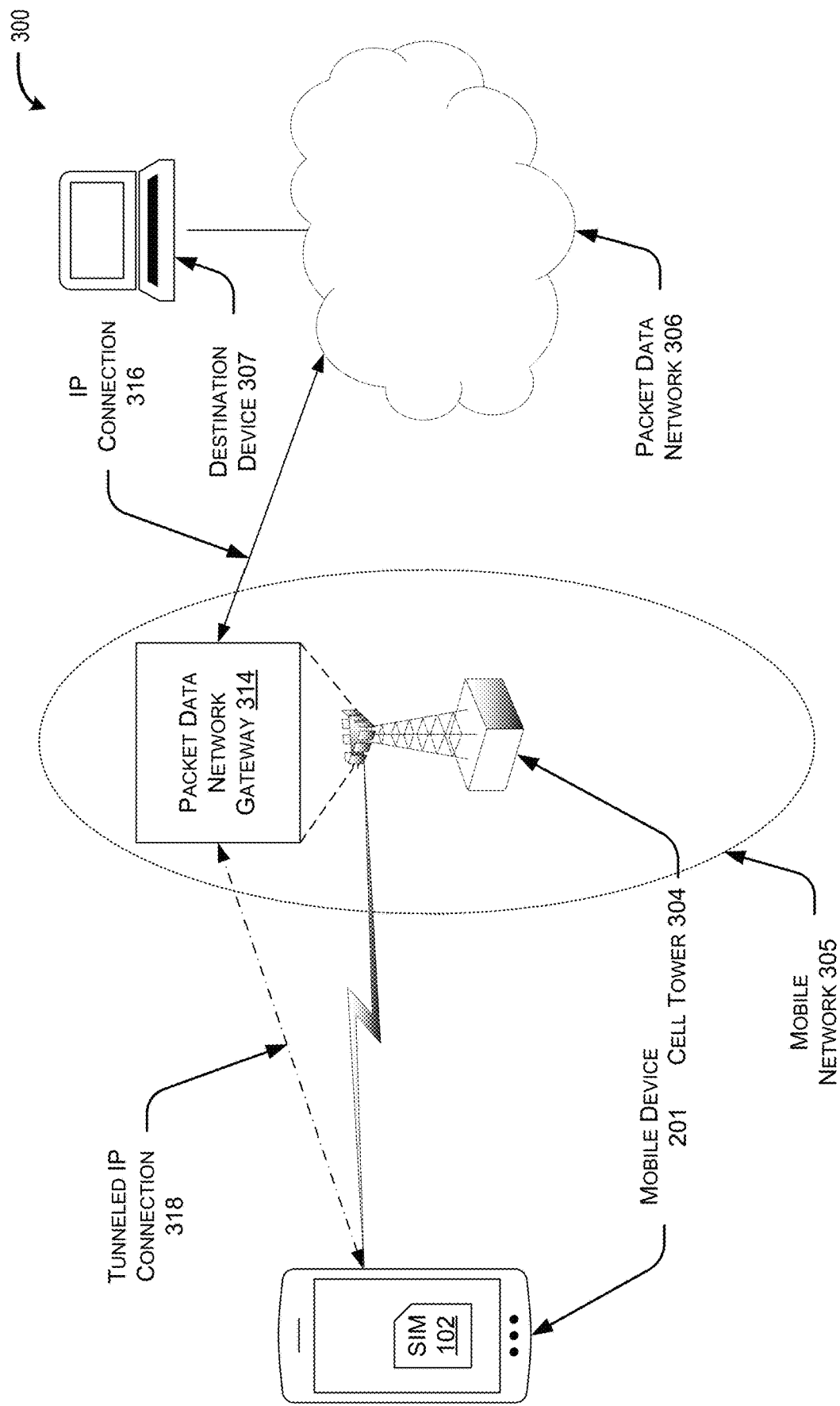
FIG. 3F is a block diagram illustrating an internet protocol (IP) connection from the mobile device to a destination device via the packet data network, according to one embodiment.

FIG. 3F is a block diagram 300 illustrating an IP connection 316 from mobile device 201 to a destination device 307 via the packet data network 306, according to one embodiment. In some configurations, mobile network 305 is circuit switched, in that connections are established and held open until there is no more data to transfer. This is in contrast to a packet switched network, e.g. PDN 306, or the internet, in which data is broken into discrete quanta, e.g. packets, and routed separately over multiple connections to the destination. As such, circuit switched networks do not naturally interoperate with packet-switched networks. Instead, mobile network 305 uses packet data network gateway 314 to tunnel IP connection 316 to mobile device 201, i.e. via tunneled IP connection 318.

However, in another embodiment, mobile network 305 is itself packet switched, such that data network gateway 314 merely performs network address translation as packets are bridged between the mobile network 305 and the packet data network 306.

Figure 4A:
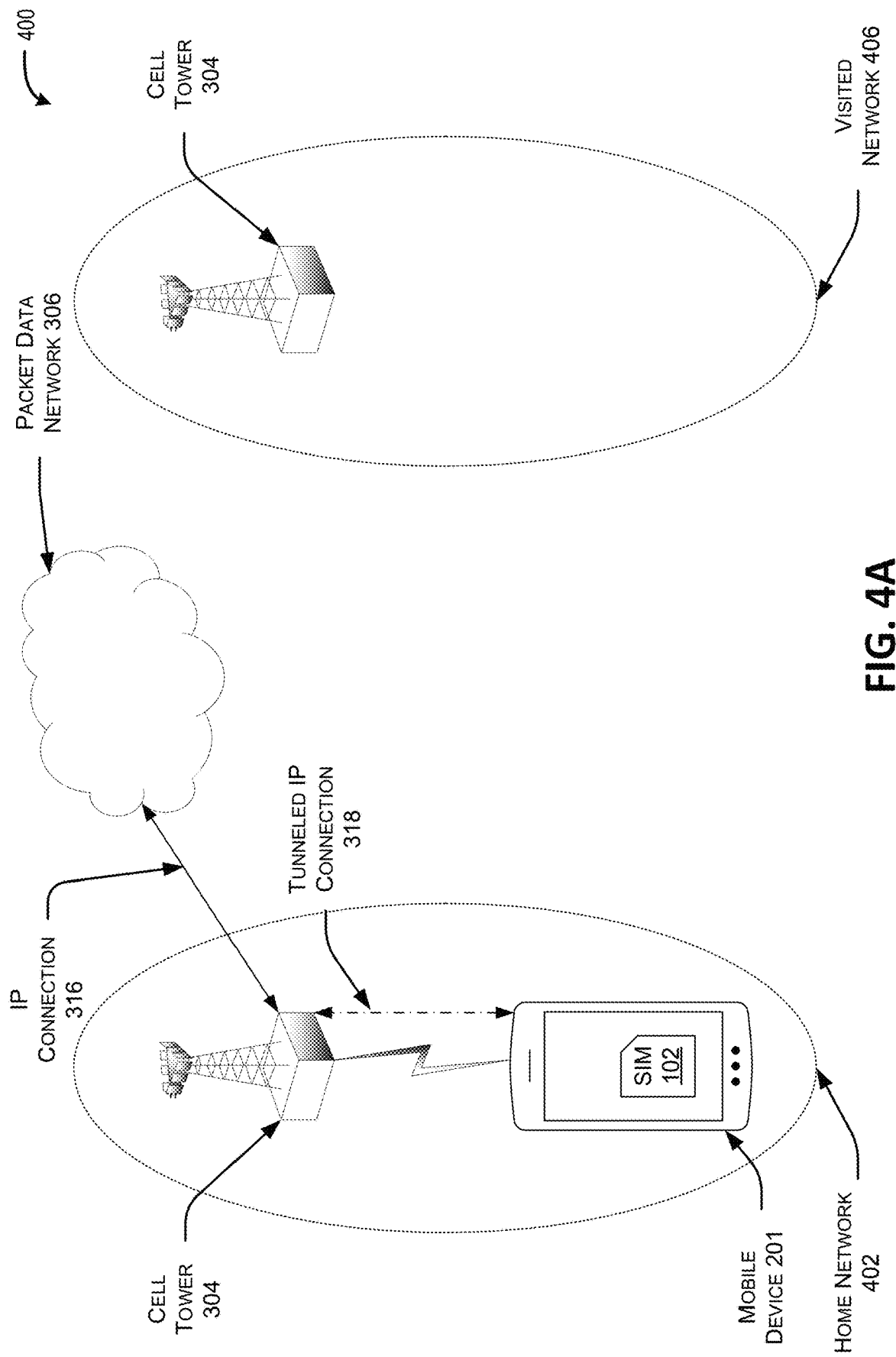
FIG. 4A is a block diagram illustrating a mobile device registered with a home network, according to one embodiment.

FIG. 4A is a block diagram 400 illustrating mobile device 201 registered with a home network 402. In some configurations, mobile device 201 has created an IP connection 316 to a destination device on packet data network 306, i.e. via tunneled IP connection 318. FIG. 4A also depicts visited network 406.

Figure 4B:
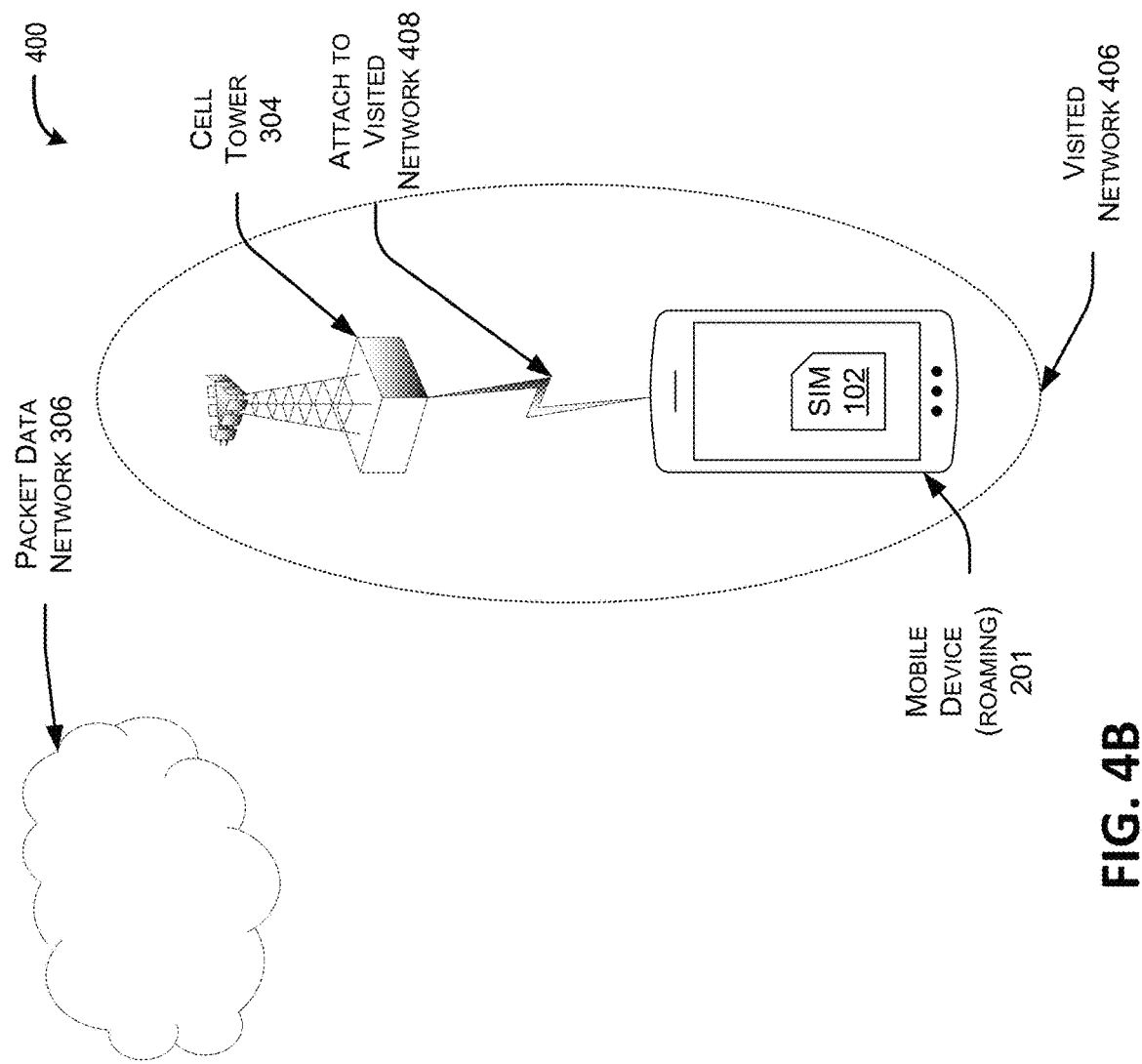
FIG. 4B is a block diagram illustrating a mobile device registered with a visited network, according to one embodiment.
Figure 4B:
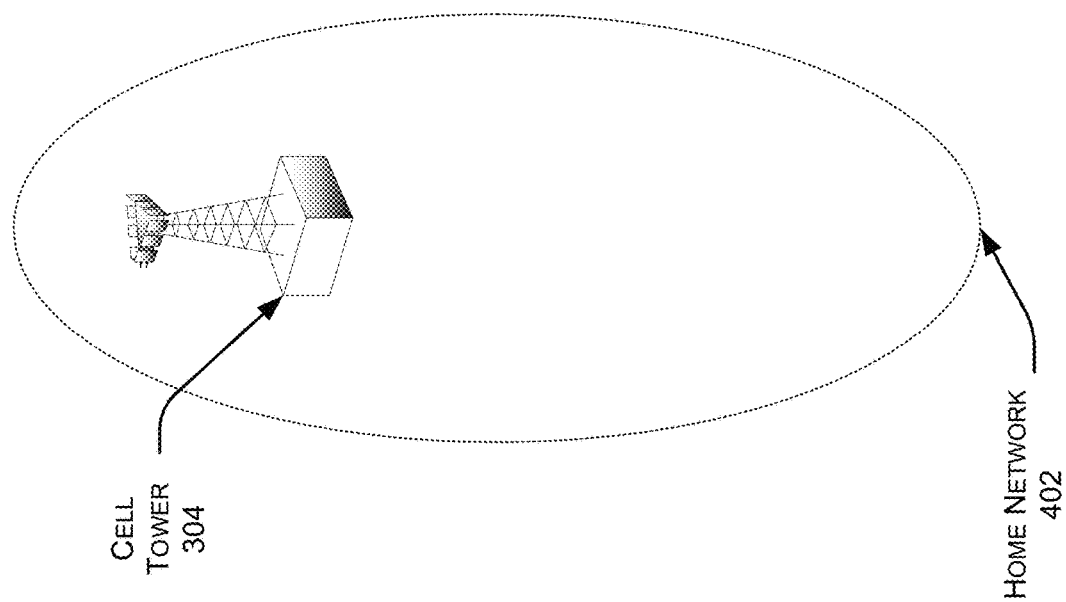

FIG. 4B is a block diagram 400 illustrating mobile device 201 registered with visited network 406, according to one embodiment. Mobile device 201 is now roaming, and no longer connected to its home network or PDN 306.

Figure 4C:
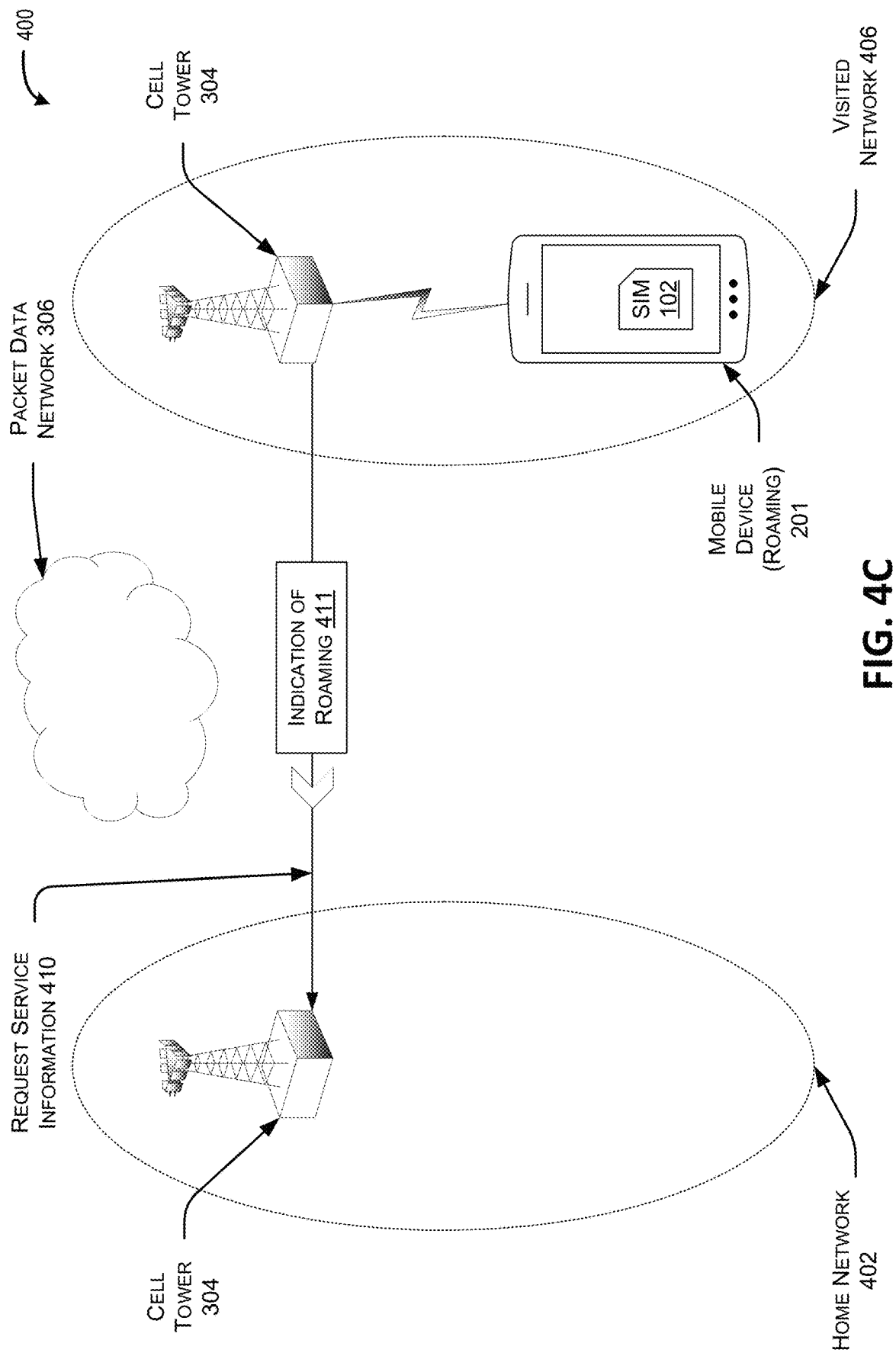
FIG. 4C is a block diagram illustrating a mobile device causing an indication of roaming to be transmitted to a home network, according to one embodiment.

FIG. 4C is a block diagram 400 illustrating mobile device 201 causing an indication of roaming 411 to be transmitted to home network 402. Indication of roaming 411 may be a communication created specifically to indicate that mobile device 201 is roaming. Alternatively, home network 402 may infer from visited network 406 connecting to the home subscriber server (HSS) of home network 402 that mobile device 201 is roaming.

Figure 4D:
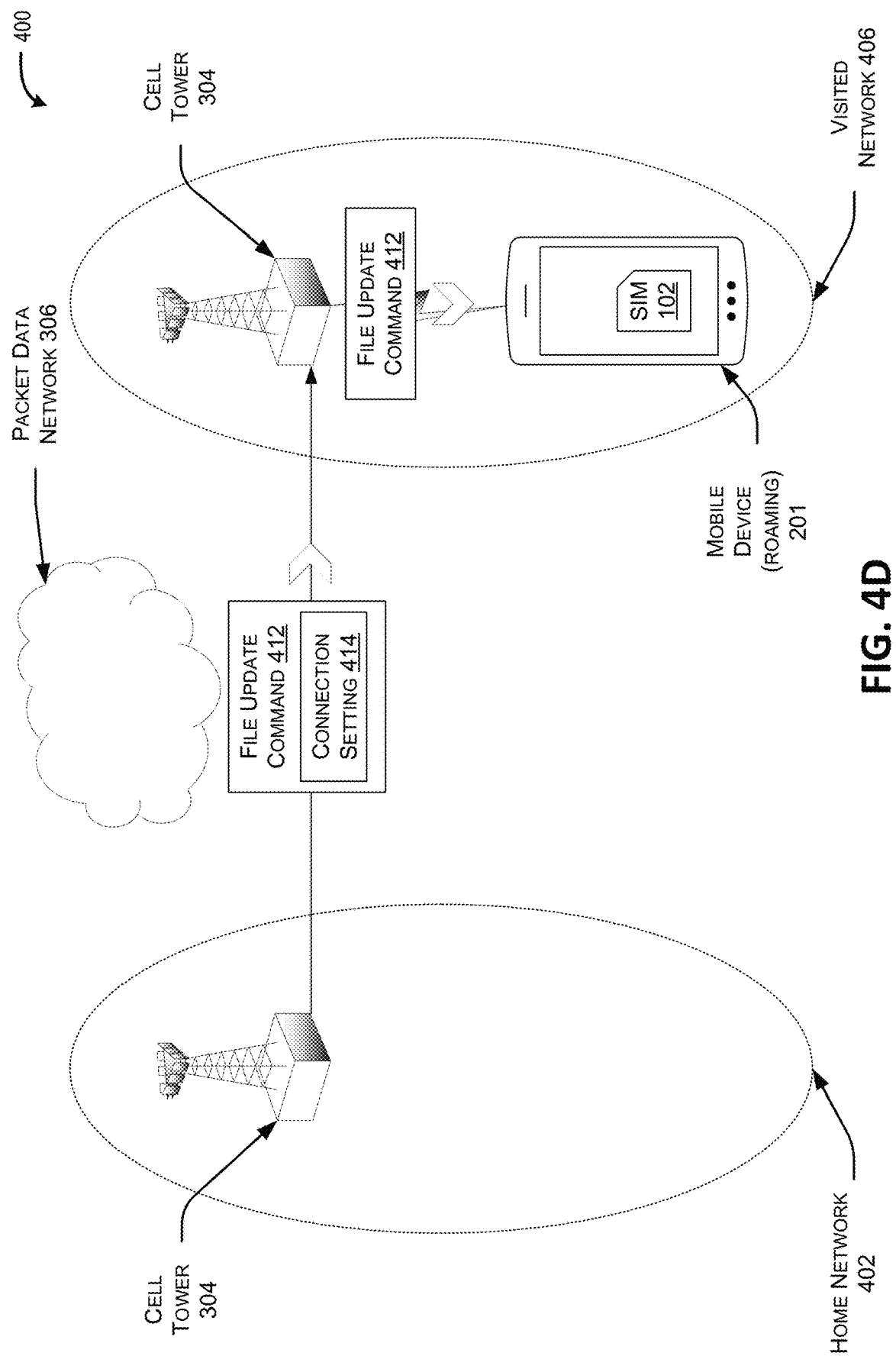
FIG. 4D is a block diagram illustrating a file update command sent in response to the indication of roaming, according to one embodiment.

FIG. 4D is a block diagram 400 illustrating a file update command 412 used to update connection settings on mobile device 201. The file update command may be sent by home network 402 in response to the indication of roaming 411. In one embodiment, file update command 412 includes connection setting 414. Upon executing the file update command 412, the connection setting may be copied into an elementary file that stores connection settings for mobile device 201, or if mobile device 201 utilizes an eSIM, into eSIM profile metadata.

In some configurations, mobile device 201 makes connection setting 414 the active connection setting, and mobile device 201 re-establishes a connection to a PDN using the updated, active connection setting 414. In other configurations, connection setting 414 is added to a list of connection settings.

In some configurations, connection setting 414 includes a visited network identifier 118. In this way, when mobile device 201 queries the list of connection settings 414, mobile device 201 may limit the query results to connection settings associated with visited network 406.

Figure 4E:
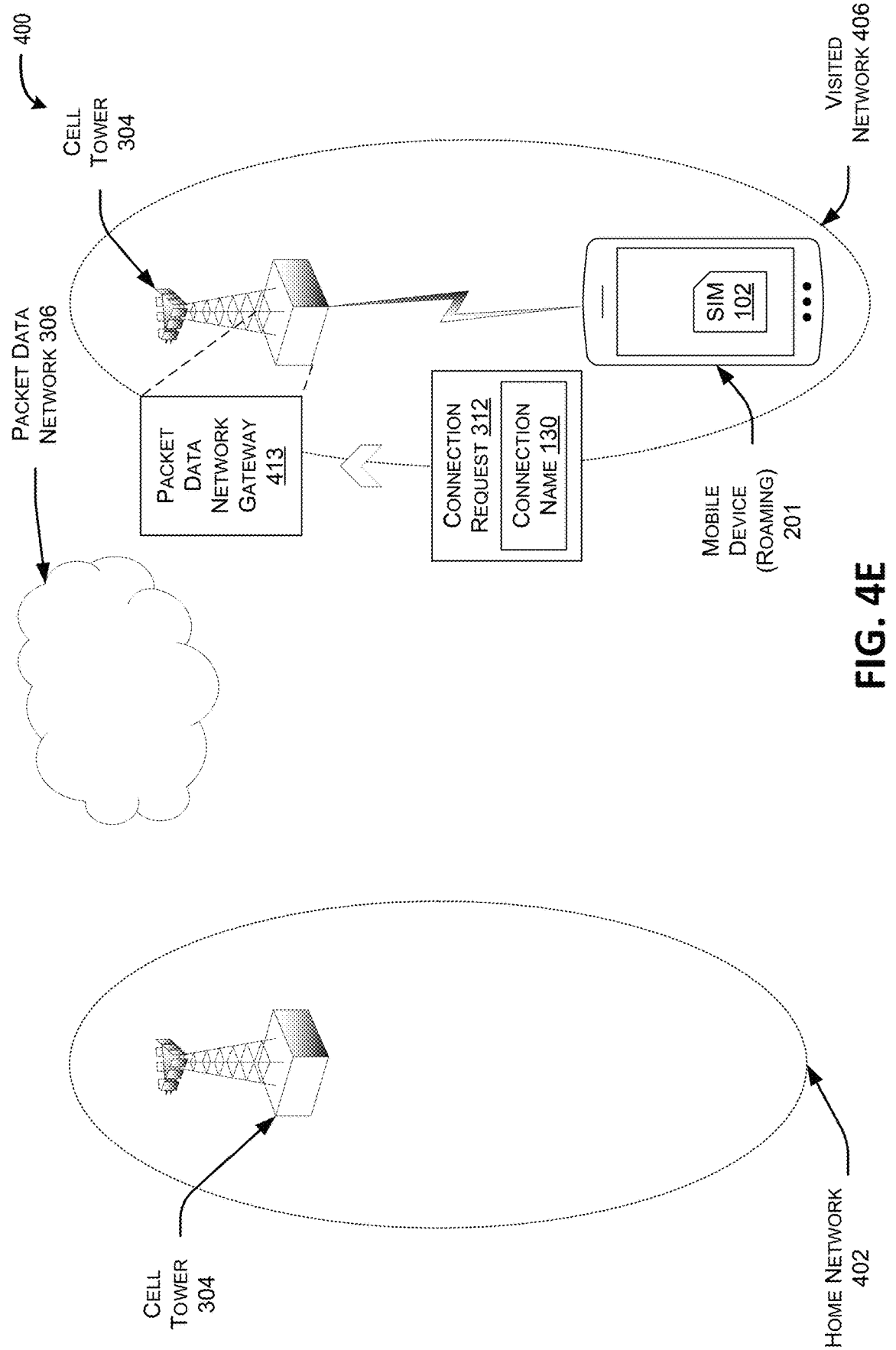
FIG. 4E is a block diagram illustrating sending a connection request to a packet data network gateway, according to one embodiment.

FIG. 4E is a block diagram 400 illustrating sending a connection request 312 to a packet data network gateway 413 of visited network 406. In some configurations, the connection request 312 includes a connection name 130 extracted from connection setting 414. Mobile device 201 may also utilize the IP type, whether a proxy server should be used to create the connection, any secondary authentication protocol, etc., or other connection properties included in connection setting 414. Mobile device 201, visited network 406, and packet data network 306 may proceed to create an IP connection as discussed above in conjunction with FIG. 3

Figure 4F:
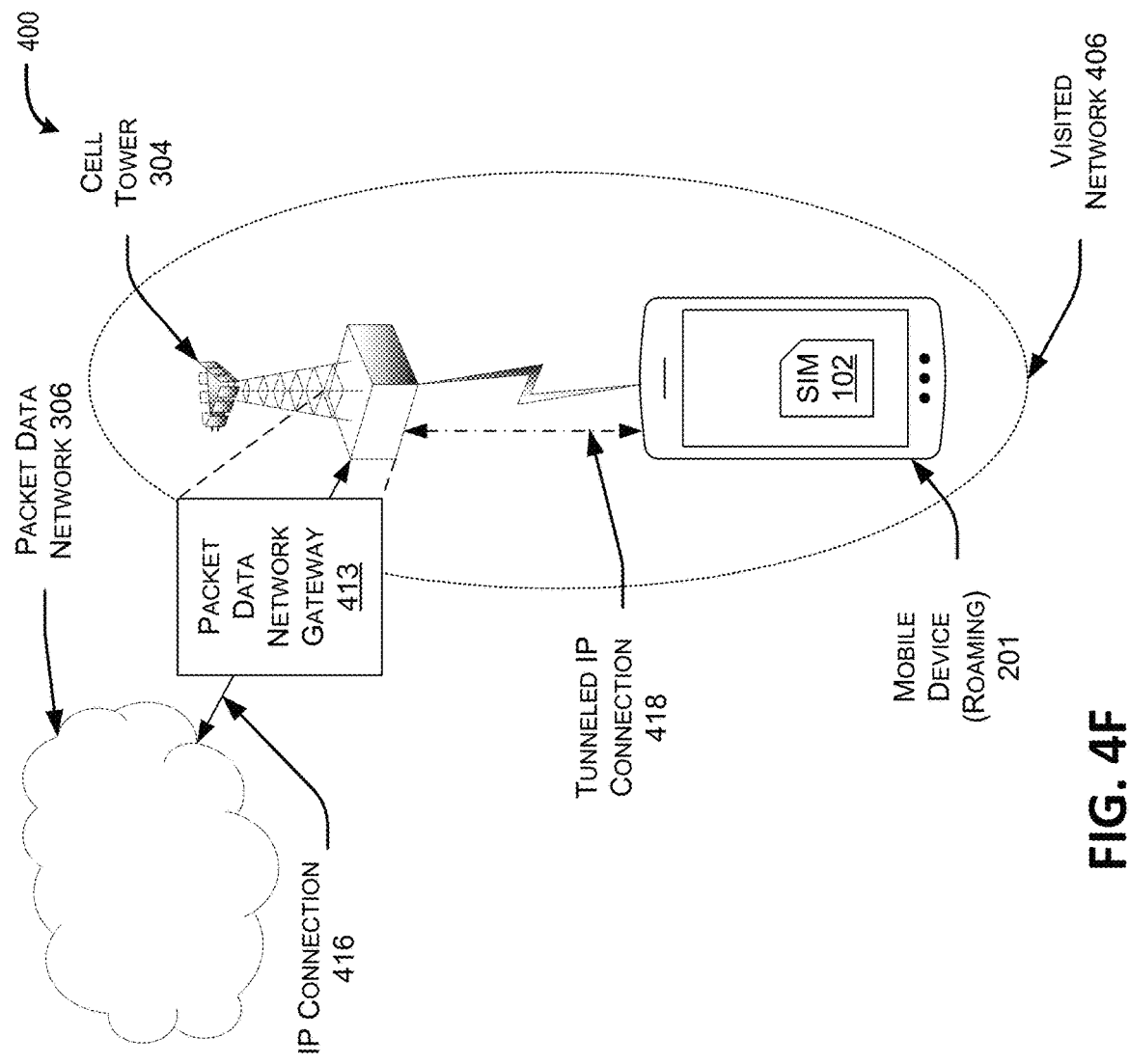
FIG. 4F is a block diagram illustrating a mobile device connected to a packet data network over an IP connection, according to one embodiment.
Figure 4F:
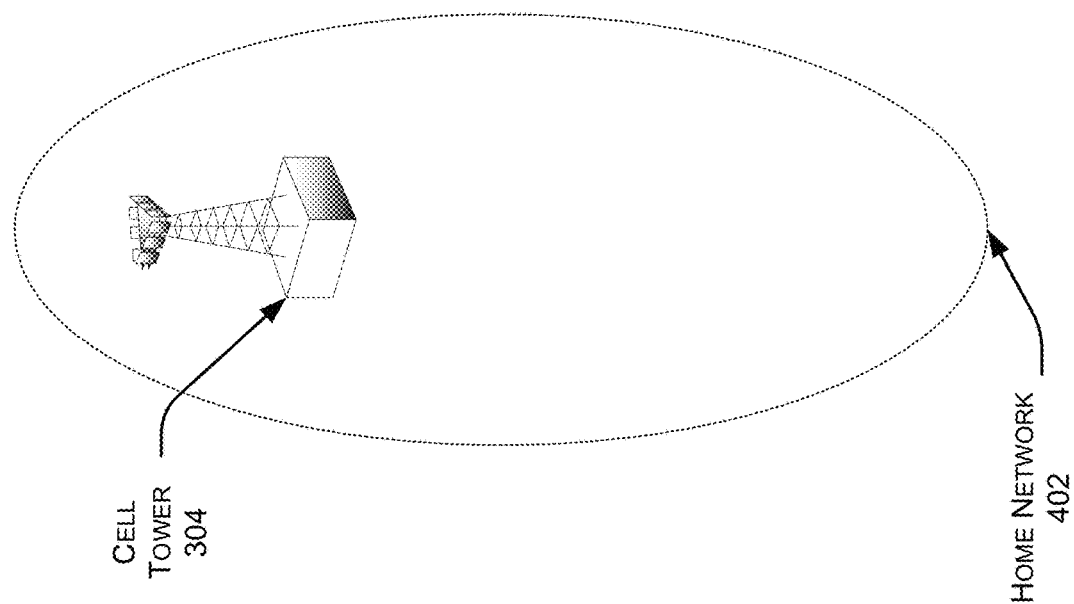

FIG. 4F is a block diagram 400 illustrating mobile device 201 connected to packet data network 306 over an IP connection 416. In some configurations, IP connection 416 includes tunneled IP connection 418, which passes between packet data network gateway 412 over a mobile network to mobile device 201.

Figure 4G:
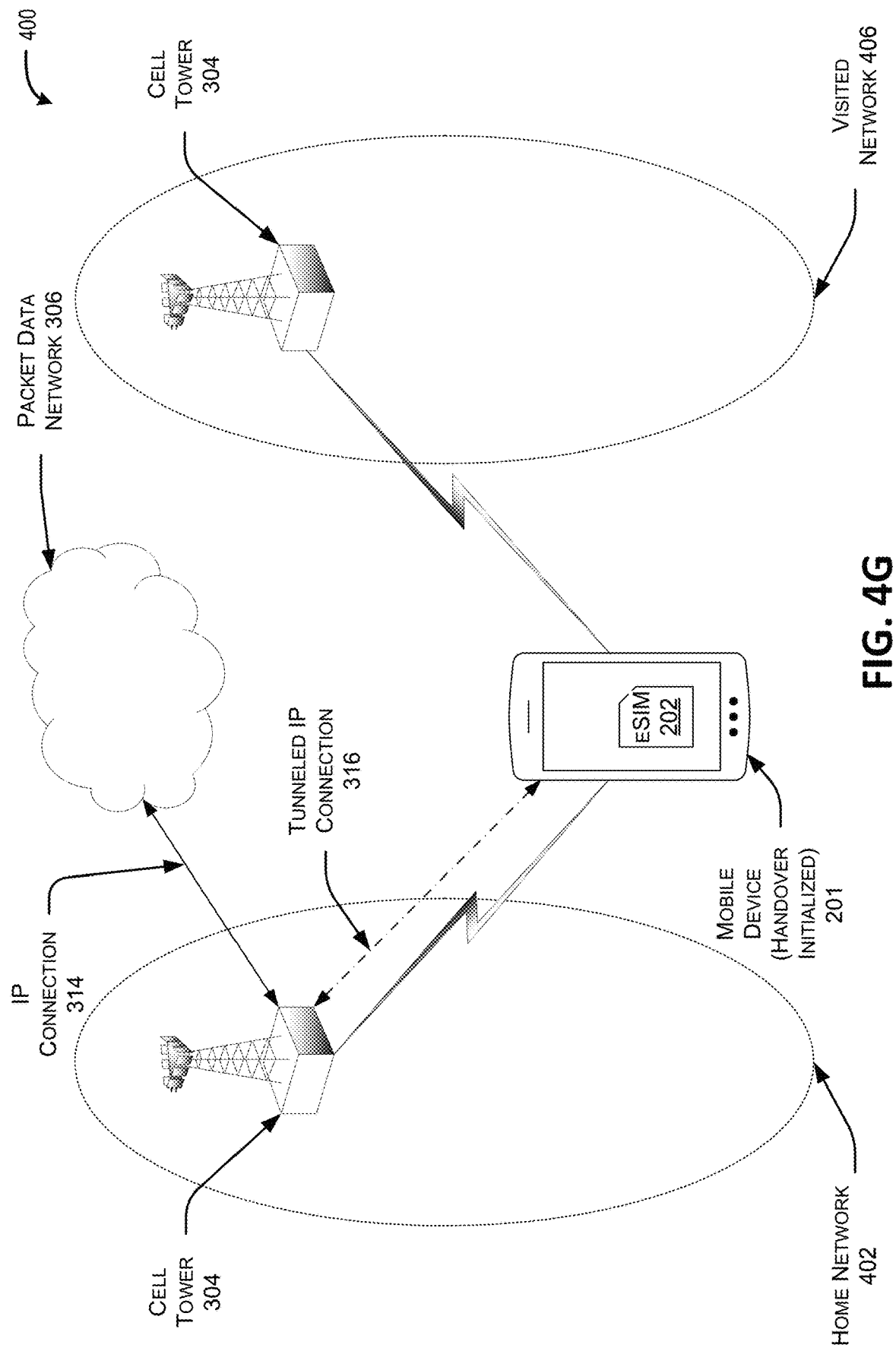
FIG. 4G is a block diagram illustrating a mobile device that is roaming from a home network to a visited network, according to one embodiment.

FIG. 4G is a block diagram 400 illustrating a mobile device that is roaming from home network 402 to visited network 406, according to one embodiment. In some configurations, mobile device 201 is beginning a handover procedure in which home network 402 is made aware that mobile device 201 is roaming to visited network 406. In this configuration, handing over mobile device 201 functions as the indication of roaming message 411 discussed above in conjunction with FIG. 4C.

Figure 4H:
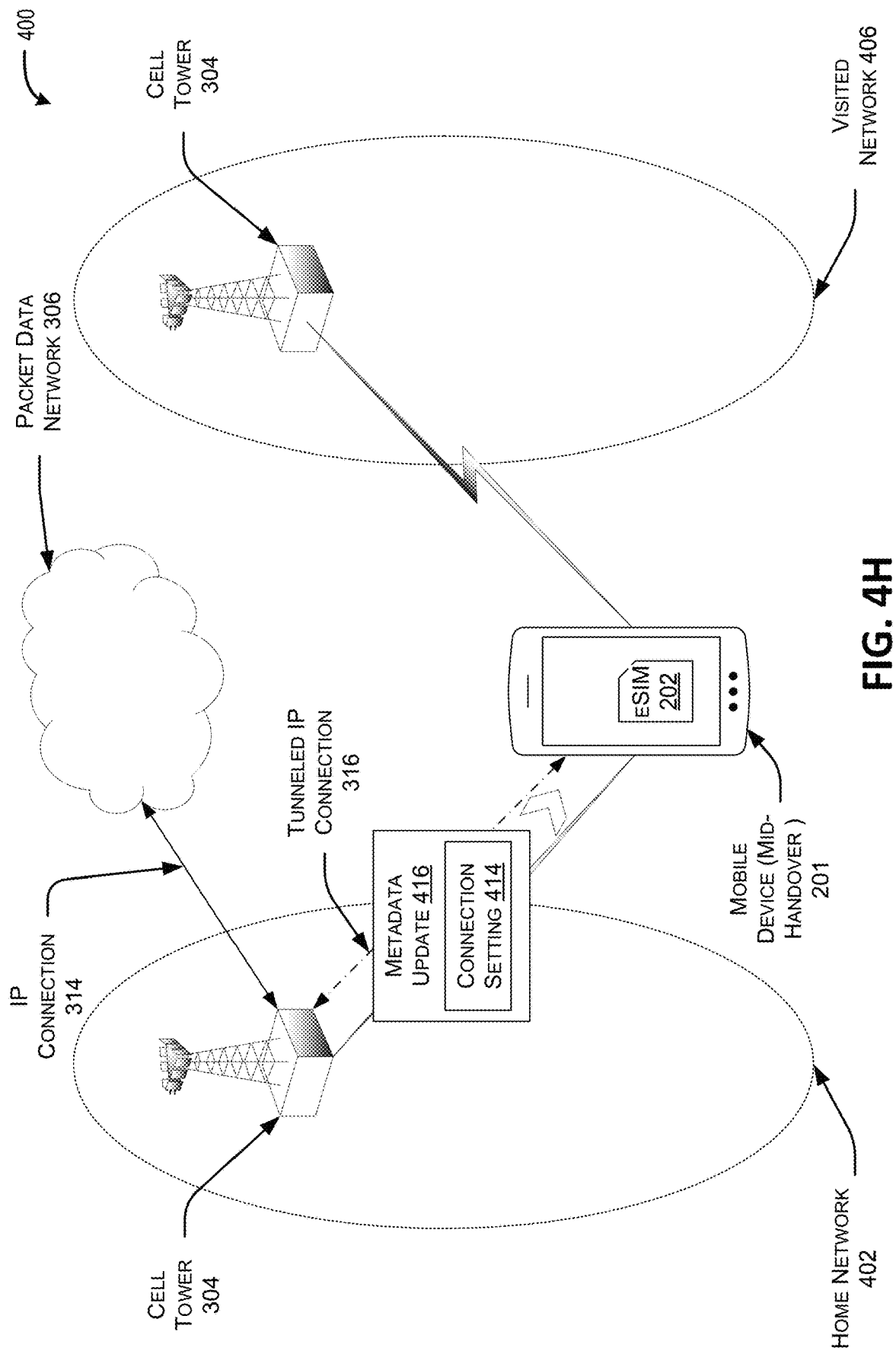
FIG. 4H is a block diagram illustrating a mobile device receiving a connection setting via a metadata update, according to one embodiment.

FIG. 4H is a block diagram 400 illustrating mobile device 201 receiving a connection setting 414 via a metadata update 416. As depicted, metadata update 416 containing connection setting 414 was triggered by mobile device 201 roaming to visited network 406. As discussed above in conjunction with FIG. 4E, connection setting 414 may include a connection name property that refers to packet network gateway 413 of the visited network 406. In this way, mobile device 201 may connect to packet data network 306 directly through gateway 413 of visited network 406, reducing latency and the expense caused by routing traffic from visited network 406 to the home network 402 and back again.

Figure 4I:
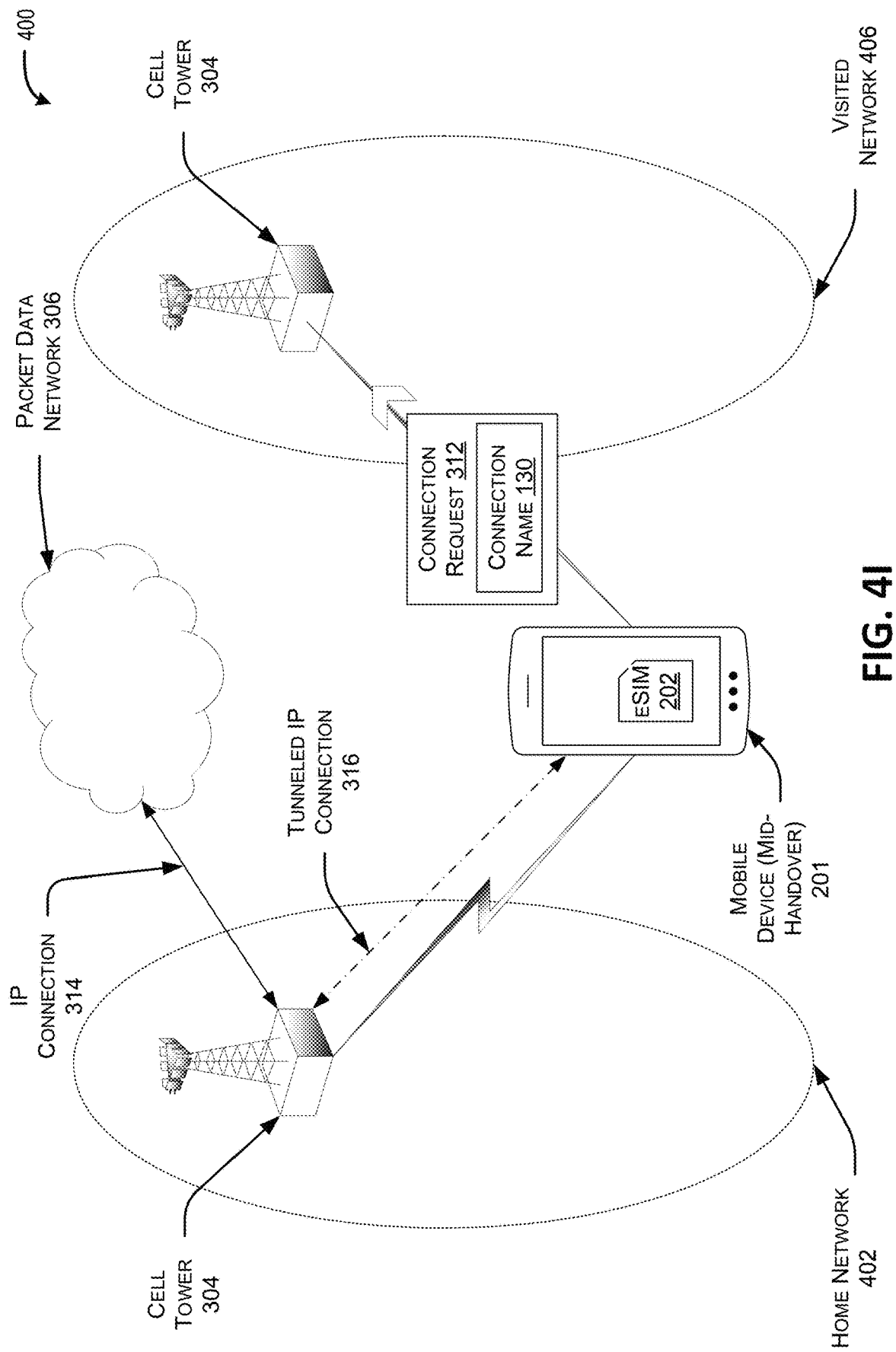
FIG. 4I is a block diagram illustrating a mobile device establishing an IP connection with packet data network 306 through a visited network 406, according to one embodiment.

FIGS. 4G-4I depict mobile device 201 having an eSIM 202. As discussed above in conjunction with FIG. 2, eSIMs that store connection settings in profile metadata may be updated with an OTA metadata update operation. Additionally, or alternatively, eSIMs that store connection settings 114 in one or more files may be updated via an OTA file update operation.

FIG. 4I is a block diagram 400 illustrating mobile device 201 establishing an IP connection with packet data network 306 directly through a visited network 406. Once the IP connection is established, the resulting topology will be similar to if not the same as that discussed above in conjunction with FIG. 4F.

Figure 5:
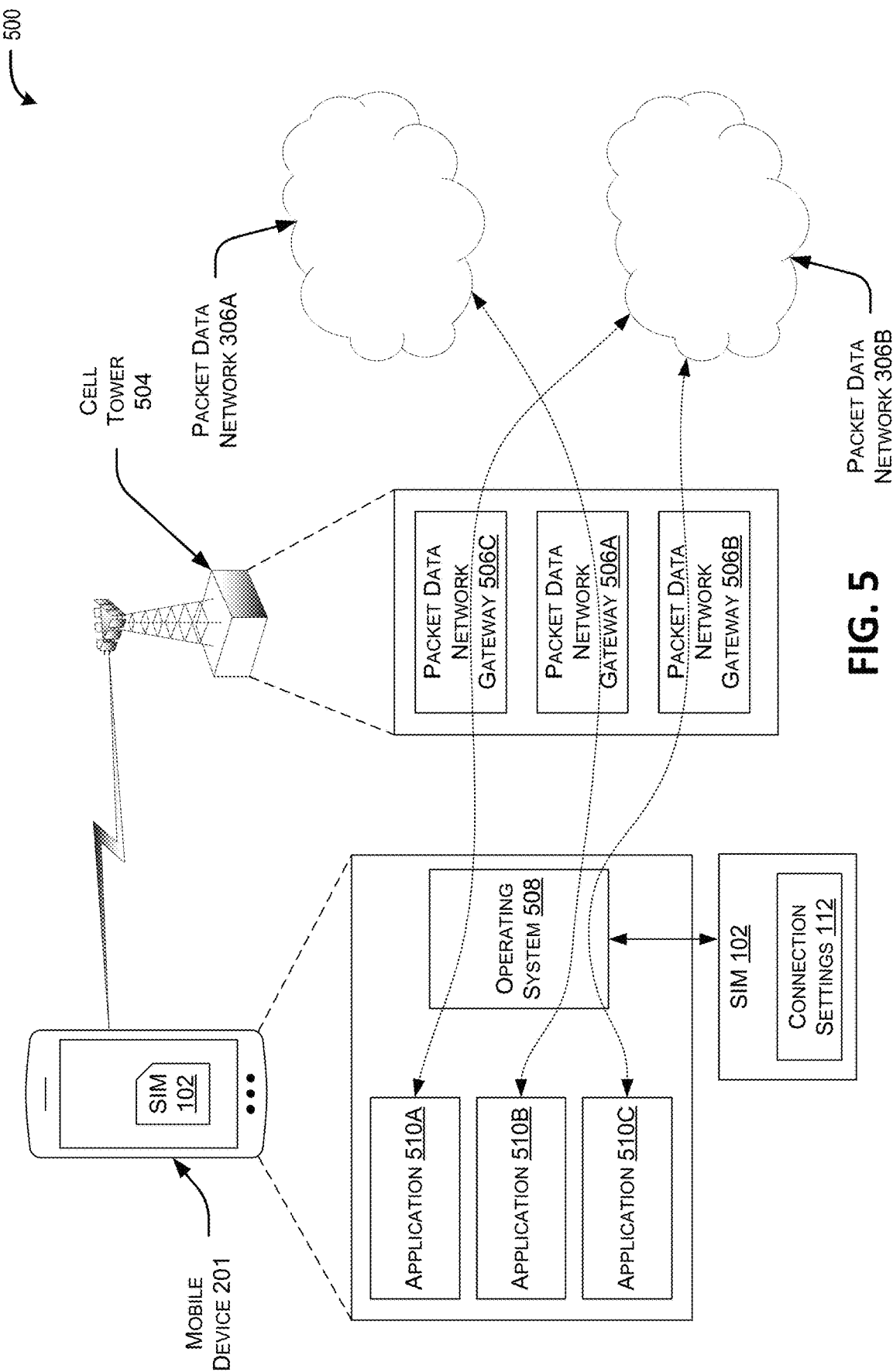
FIG. 5 is a block diagram illustrating a mobile device selecting which gateway to route a connection through, according to one embodiment.

FIG. 5 is a block diagram 500 illustrating a mobile device 201 selecting which gateway 506 to route a connection through. In some configurations, SIM card 102 has been inserted into mobile device 201. SIM card 102 may contain one or more pre-loaded connection settings, as discussed above in conjunction with FIGS. 1 and 2. Mobile device 201 may be registered with cell tower 504, which as illustrated contains three packet data network gateways 506A-506C. Packet data network gateways 506 are how mobile device 201 communicates with devices over packet data networks 306.

In some embodiments, operating system 508 executing on mobile device 201 is capable of selecting different connection settings for different applications 510. The portion of operating system 508 that performs this functionality is connection setting manager 301. As illustrated, application 510A is connected to packet data network (PDN) 306B via packet data network gateway (PDNG) 506C. Application 510B is connected to PDN 306A via PDNG 506A, and Application 510C is connected to PDN 406B via PDNG 506B.

Operating system 508 may select a connection setting 112 for a particular application 510 based on one or more of a number of criteria discussed above, including the location of mobile device 201, whether the device is roaming, whether the device is roaming internationally, what network is targeted (e.g. the public internet, a private gateway, IMS), application type (e.g. game, business, video call), device type, usage history, whether a Wi-Fi network is also available, or a combination thereof.

Figure 6:
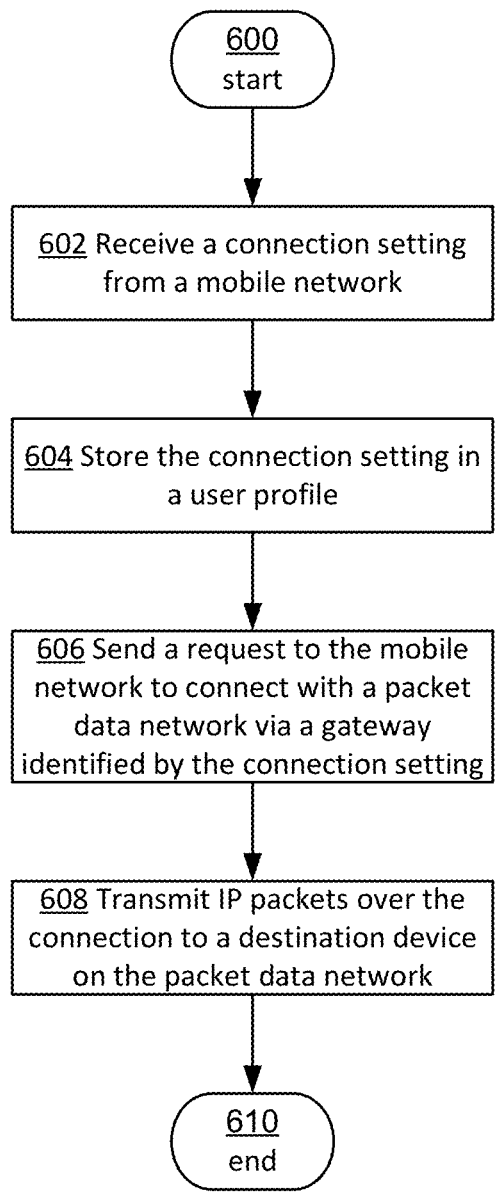
FIG. 6 is a flow diagram illustrating an example operational procedure according to the described implementations, according to one embodiment.

FIG. 6 is a flow diagram 600 illustrating an example operational procedure according to the described implementations, according to one embodiment. Operational procedure 600 may be implemented by connection setting manager 301.

Referring to FIG. 6, operation 600 begins the procedure. From operation 600, the routine 600 proceeds to operation 602, where connection setting manager 301 receives a connection setting 112 from a mobile network 305. The routine 600 then proceeds from operation 602 to operation 604. At operation 604, connection setting manager 301 stores the received connection setting in a user profile, e.g. a SIM profile 104.

The routine 600 then proceeds from operation 604 to operation 606, where the connection setting manager 301 sends a request 312 to the mobile network 305 to connect with packet data network 306 via packet data network gateway 314 identified by connection setting 112. The routine 600 then proceeds from operation 606 to operation 608, where mobile device 201 transmits IP packets over IP connection 316 to destination device 307 on packet data network 306. The routine 600 then proceeds from operation 608 to operation 610, where it ends.

Figure 7:
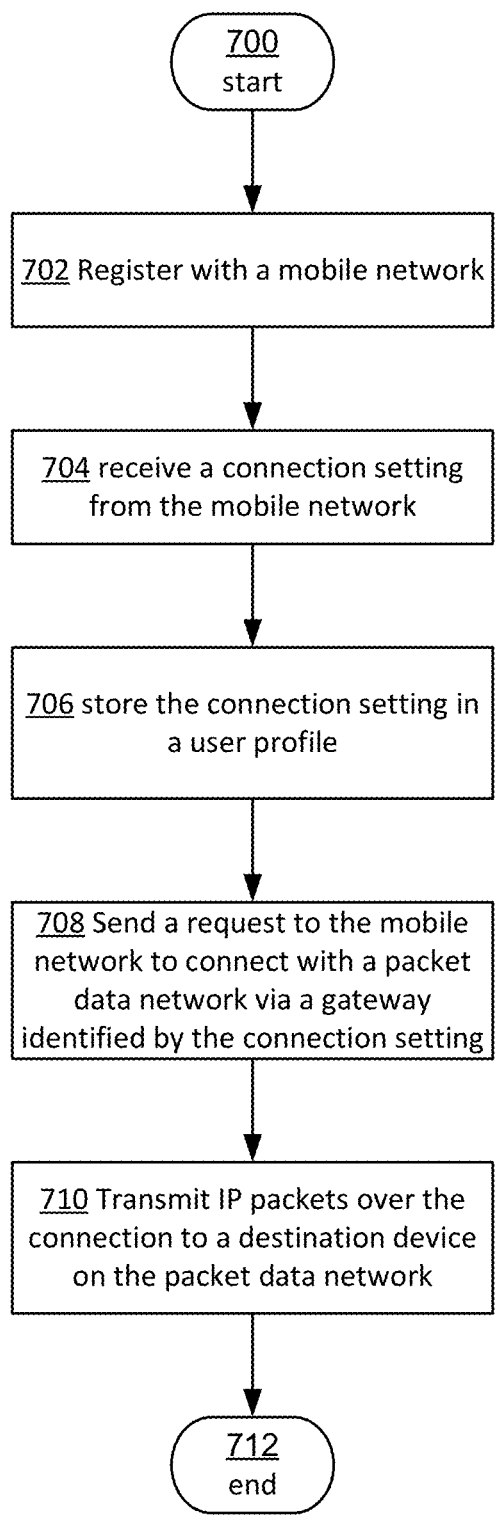
FIG. 7 is a flow diagram illustrating an example operational procedure according to the described implementations, according to one embodiment.

FIG. 7 is a flow diagram 700 illustrating an example operational procedure according to the described implementations, according to one embodiment. Operational procedure 700 may be implemented by connection setting manager 301.

Referring to FIG. 7, operation 700 begins the procedure. From operation 700, the routine 700 proceeds to operation 702, where connection setting manager 301 registers with mobile network 305. The routine 700 then proceeds from operation 702 to operation 704, where connection setting manager 301 receives connection setting 112 from mobile network 305. The routine 700 then proceeds from operation 704 to operation 706. At operation 706, connection setting manager 301 stores the received connection setting in a user profile, e.g. SIM profile 104.

The routine 700 then proceeds from operation 706 to operation 708, where the connection setting manager 301 sends request 312 to mobile network 305 to connect with packet data network 306 via packet data network gateway 314 identified by connection setting 112. The routine 700 then proceeds from operation 708 to operation 710, where mobile device 301 transmits IP packets over IP connection 316 to destination device 307 on packet data network 306. The routine 700 then proceeds from operation 710 to operation 712, where it ends.

Figure 8:
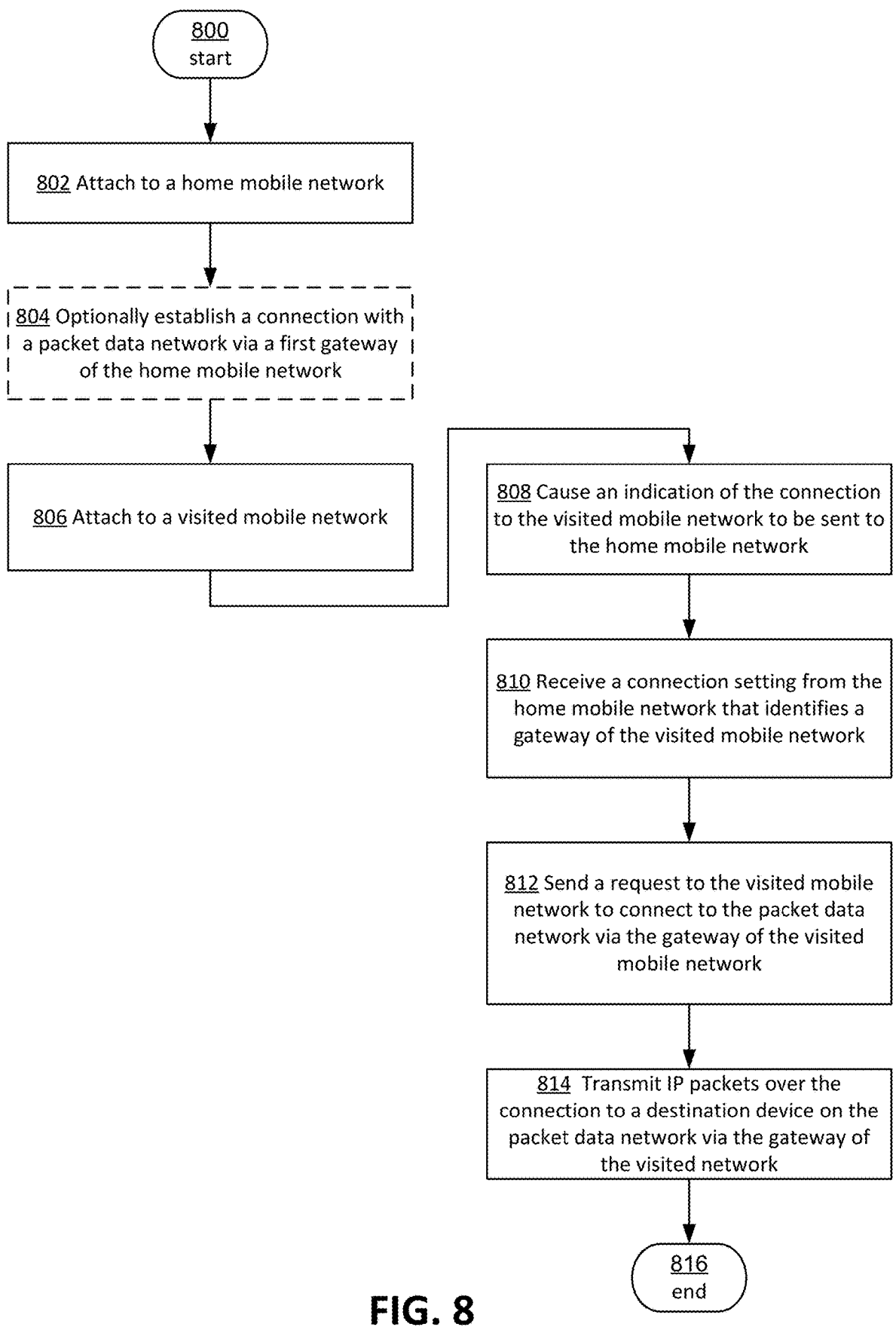
FIG. 8 is a flow diagram illustrating an example operational procedure according to the described implementations, according to one embodiment.

FIG. 8 is a flow diagram 800 illustrating an example operational procedure according to the described implementations, according to one embodiment. Operational procedure 800 may be implemented by connection setting manager 301.

Referring to FIG. 8, operation 800 begins the procedure. From operation 800, the routine 800 proceeds to operation 802, where connection setting manager 301 attaches to home mobile network 402. The routine 800 then proceeds from operation 802 to operation 804, where connection setting manager 301 optionally establishes connection 316 via first gateway 314 of home mobile network 402. The routine 800 then proceeds from operation 804 to operation 806. At operation 806, connection setting manager 301 attaches to a visited mobile network 406.

The routine 800 then proceeds from operation 806 to operation 808, where connection setting manager 301 causes an indication of the connection to visited mobile network 411 to be transmitted to home mobile network 402. The routine 800 then proceeds from operation 808 to operation 810, where mobile device 301 receives a connection setting 414 from home mobile network 402 that identifies gateway 413 of the visited mobile network 406. The routine 800 then proceeds from operation 810 to operation 812, where mobile device 301 sends connection request 312 to visited mobile network 406 to connect to packet data network 306 via gateway 413 of visited mobile network 406.

The routine 800 then proceeds from operation 812 to operation 814, where mobile device 301 transmits IP packets over IP connection 416 to destination device 307 on packet data network 306. The routine 800 then proceeds from operation 814 to operation 816, where it ends.

It should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the described methods are described herein as being implemented, at least in part, by system components, which can comprise an application, component and/or a circuit. In some configurations, the system components include a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Figure 9:
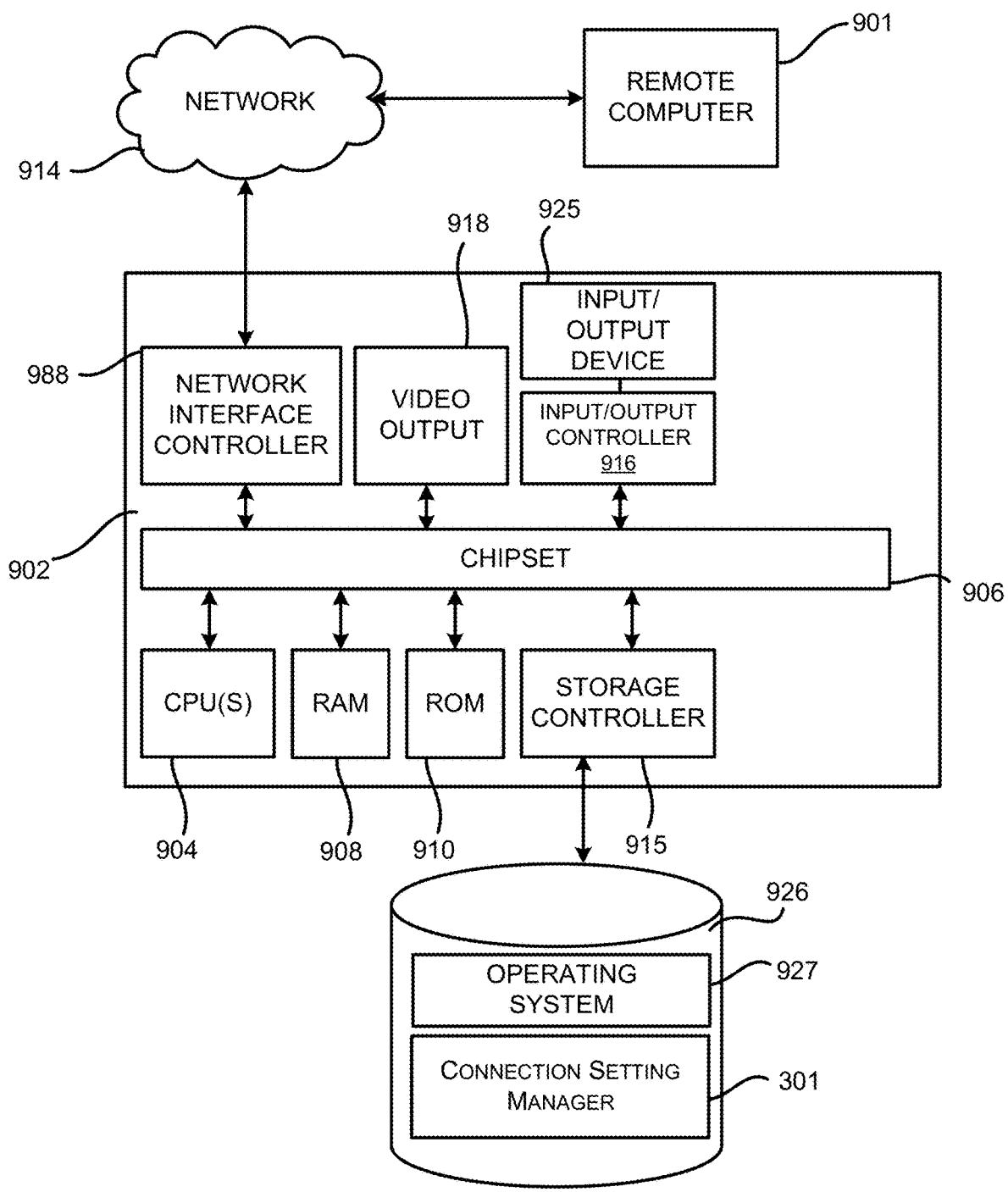
FIG. 9 is a computer architecture diagram illustrating a computing device architecture for a computing device capable of implementing aspects of the techniques and technologies presented herein, according to one embodiment.

Although FIG. 9 refers to the components of FIG. 1-8, it can be appreciated that the operations of the described methods may be also implemented in many other ways. For example, the methods may be implemented, at least in part, by a processor of another remote computer or a local circuit. In addition, one or more of the operations of the methods may alternatively or additionally be implemented, at least in part, by a chipset working alone or in conjunction with other software modules. Any service, circuit or application suitable for providing the techniques disclosed herein can be used in operations described herein.

FIG. 9 shows additional details of an example computer architecture capable of various aspects of the embodiments described above. The computer architecture shown in FIG. 9 illustrates aspects of a system, such as a conventional server computer, workstation, desktop computer, laptop, tablet, mobile device, computing or processing systems embedded in devices (such as wearables, automobiles, home automation etc.), or other computing device, and may be utilized to execute any of the software components presented herein. For example, the computer architecture shown in FIG. 9 may be utilized to execute any of the software components described above.

The computer architecture includes a baseboard 902, or "motherboard," which is a printed circuit board to which a multitude of components or devices may be connected by way of a system bus or other electrical communication paths. In one illustrative embodiment, one or more central processing units (CPUs) 904 operate in conjunction with a chipset 906. The CPUs 904 may be standard programmable processors that perform arithmetic and logical operations necessary for the operation of the computer architecture.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a RAM 908, used as the main memory in the computer architecture. The chipset 906 may further provide an interface to a computer-readable storage medium such as a read-only memory (ROM) 910 or non-volatile RAM (NVRAM) for storing basic routines that help to startup the computing device and to transfer information between the various components and devices. The ROM 910 or NVRAM may also store other software components necessary for the operation of the computer architecture in accordance with the embodiments described herein.

The computer architecture may operate in a networked environment using logical connections to remote computing devices and computer systems through a network 914, such as the local area network. The chipset 906 may include functionality for providing network connectivity through a network interface controller (NIC) 988, such as a gigabit Ethernet adapter, WiFi adapter, cellular modem (e.g. GPRS, LTE, etc.). The NIC 988 is capable of connecting the computer architecture to other computing devices over the network 914. It should be appreciated that multiple NICs 988 may be present in the computer architecture, connecting the computer to other types of networks and remote computer systems. The network allows the computer architecture to communicate with remote services and servers, such as the remote computer 901. As can be appreciated, the remote computer 901 may be any computing device, such as a computing device that is part of a cell tower 304.

The computer architecture may be connected to a mass storage device 926 that provides non-volatile storage for the computing device. The mass storage device 926 may store system programs, application programs, other program modules, and data, which have been described in greater detail herein. The mass storage device 926 may be connected to the computer architecture through a storage controller 915 connected to the chipset 906. The mass storage device 926 may consist of one or more physical storage units. The storage controller 915 may interface with the physical storage units through a serial attached SCSI (SAS) interface, a serial advanced technology attachment (SATA) interface, a fiber channel (FC) interface, or other type of interface for physically connecting and transferring data between computers and physical storage units. It should also be appreciated that the mass storage device 926, other storage media and the storage controller 915 may include MultiMediaCard (MMC) components, eMMC components, Secure Digital (SD) components, PCI Express components, or the like.

The computer architecture may store data on the mass storage device 926 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 926 is characterized as primary or secondary storage, and the like.

For example, the computer architecture may store information to the mass storage device 926 by issuing instructions through the storage controller 915 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture may further read information from the mass storage device 926 by detecting the physical states or characteristics of one or more particular locations within the physical storage units.

In addition to the mass storage device 926 described above, the computer architecture may have access to other computer-readable media to store and retrieve information, such as program modules, data structures, or other data. As the operating system 927, connection setting manager 301, and other data and other modules are depicted as data and software stored in the mass storage device 926, it should be appreciated that these components and/or other modules may be stored, at least in part, in other computer-readable storage media of the computer architecture. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium," "computer-readable storage medium," and variations thereof, does not include waves or signals per se and/or communication media.

The mass storage device 926 may store an operating system 927 utilized to control the operation of the computer architecture. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, or iOS operating systems, available from their respective manufacturers. It should be appreciated that other operating systems may also be utilized. The mass storage device 926 may store other system or application programs and data utilized by the computer architecture, such as any of the other software components and data described above. The mass storage device 926 might also store other programs and data not specifically identified herein.

In one embodiment, the mass storage device 926 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 904 transition between states, as described above. According to one embodiment, the computer architecture has access to computer-readable storage media storing computer-executable instructions which, when executed by the computer architecture, perform the various routines described above with regard to FIG. 9, and the other FIGS. The computing device might also include computer-readable storage media for performing any of the other computer-implemented operations described herein.

The computer architecture may also include one or more input/output controllers 916 for receiving and processing input from a number of input devices, such as a keyboard, a mouse, a microphone, a headset, a touchpad, a touch screen, an electronic stylus, image processing and gesture recognition devices, or any other type of input device. The input/output controller 916 is in communication with an input/output device 925. The video output 918 may provide output to a display, such as a computer monitor, a flat-panel display, a digital projector, a printer, a plotter, or other type of output device. The input/output controller 916 may provide input communication with other devices such as a microphone, a speaker, game controllers and/or audio devices.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

The disclosure presented herein also encompasses the subject matter set forth in the following clauses:

Clause 1. A method for enabling an expedited selection of a gateway 314 used by a computing device 101 to connect to a packet data network 306, the method comprising: establishing a first connection between the computing device 101 and the packet data network 306 via a first gateway 314, wherein the first gateway 314 is selected by a mobile network 305 based on a first connection name 130 provided by the computing device 101 when establishing the first connection; receiving, over the first connection, a connection setting 112 from the mobile network 305, wherein the connection setting 112 includes a second connection name 130 associated with a second gateway 314, and wherein the second connection name 130 is assigned by the mobile network 305 to a subscriber identity module (SIM) profile 104 used by the computing device 101; storing the connection setting 112 including the second connection name 130 in the SIM profile 104, the storage of the second connection name 130 in the SIM profile 104 enabling the computing device 101 to select and communicate with the packet data network 306 via the second gateway 314; selecting the second gateway 314 by sending a connection request 313 that includes the second connection name 130 to the mobile network 305, causing the mobile network 305 to establish a second connection 316 with the packet data network 306 via the second gateway 314; and using the second connection 316 to communicate with a destination device 307 over the packet data network 306 via the second gateway 314.

Clause 2. The method of clause 1, wherein the connection setting is stored in a file on the SIM profile.

Clause 3. The method of clauses 1 and 2, wherein the connection setting is stored in a profile metadata of the SIM profile.

Clause 4. The method of clauses 1-3, wherein the connection setting is appended to a list of connection settings stored in the file on the SIM profile.

Clause 5. The method of clauses 1-4, wherein the file on the SIM file comprises an elementary file of a SIM profile file system.

Clause 6. The method of clauses 1-5, wherein the connection setting includes a connection type and one or more connection properties, wherein the one or more connection properties include the second connection name, an internet protocol (IP) type indicating whether to create an IPv4 or IPv6 type connection, or a secondary authorization protocol used when connecting to the packet data network.

Clause 7. The method of clauses 1-6, wherein the connection type indicates whether the connection is for the internet, voice of internet protocol, internet protocol multimedia subsystem, or mobile network operator provisioning.

Clause 8. The method of clauses 1-7, wherein the connection setting is received in response to an indication that the mobile device has roamed to a visited network, or wherein the first connection is an initial connection of the computing device to the mobile network, and wherein the connection setting is received in response to the initial connection of the computing device to the mobile network.

Clause 9. The method of clauses 1-8, further comprising: receiving an indication of a connection type; querying a plurality of connection settings stored in the SIM profile based on the received connection type to identify a connection name associated with the received connection type; and wherein the connection request includes the connection name associated with the received connection type.

Clause 10. A computing device 101 comprising: a memory 908 storing thereon instructions that when executed by a processor 902 of the computing device 101 cause the computing device 101 to perform operations comprising: attaching to a mobile network 305; establishing a first connection 318 over a packet data network 306 using a first connection name 130 property of a first connection setting 312 that was pre-loaded onto a subscriber identifier module (SIM) card 102 of the computing device 101; using the established first connection 318, receiving a second connection setting 112 from the mobile network 305, wherein the second connection setting 112 includes a second connection name 130 and a profile ID, wherein the second connection name 130 is associated with a second gateway 314, wherein the profile ID is associated with a SIM profile 104 stored on the SIM card 102, and wherein the second connection name 130 and the profile ID associate the SIM profile 104 with the second gateway 314; storing the second connection setting 112 including the second connection name 130 in the SIM profile 104, the storage of the second connection name 130 in the SIM profile 104 enabling the computing device 101 to select and communicate with the packet data network 306 using the second gateway 314; sending a request 313 to the mobile network 305 to establish a second connection 416, 418 over the packet data network 306, wherein the request 313 includes the second connection name 130, and wherein the request causes the mobile network 305 to establish the connection 416, 418 between the computing device 101 and the packet data network 306 via the second gateway 314; and using the second connection 416, 418 to communicate with a destination device 307 over the packet data network 306 via the second gateway 314.

Clause 11. The computing device of clause 10, wherein the second connection setting includes a connection type and a visited network identifier.

Clause 12. The computing device of clauses 10 and 11, wherein the connection type indicates that the second connection is for internet access, voice over internet protocol communication, internet protocol multimedia subsystem, or mobile network operator provisioning.

Clause 13. The computing device of clauses 10-12, wherein the second connection is established without manual entry of connection properties and without downloading connection properties using a different networking technology.

Clause 14. The computing device of clauses 10-13, wherein the second connection setting includes connection properties including the second connection name, whether to use an internet protocol (IP) v4 or an IPv6 connection, whether the second connection will use a proxy, or whether the second connection will use a secondary authentication protocol.

Clause 15. The computing device of clauses 10-14, wherein the second connection setting is received in response to connecting to a visited network, in response to the computing device migrating to a different mobile network operator, or in response to the SIM card being moved to a different type of device.

Clause 16. The computing device of clauses 10-15, further comprising: storing the second connection setting in a collection of connection settings within a profile of the SIM card; and querying the collection of connection settings based on a connection type, wherein the second connection name sent with the request to establish the second connection comprises a result of the query.

Clause 17. A mobile device 201 configured to communicate with one or more mobile networks 305, the mobile device 201 configured to: connect to a home mobile network 402; subsequent to connecting to the home mobile network 402, connect to a visited mobile network 406; cause an indication that the mobile device 406 connected to the visited mobile network 411 to be transmitted to the home mobile network 402; in response to receiving the indication that the mobile device 406 connected to the visited mobile network 411, receive a connection setting 414 from the home mobile network 402 that includes a connection name 130 of a gateway 413 of the visited mobile network 406 and receive a profile ID that identifies a subscriber identifier module (SIM) profile 104 stored on the mobile device 201; store the connection setting 414 in the SIM profile 104 identified by the received profile ID, the storage of the connection name 130 in the SIM profile 104 enabling the mobile device 101 to select and communicate with a packet data network 306 using the gateway 413 of the visited mobile network 406; send a request 312 including the connection name 130 to the visited mobile network 406 to establish a connection 416, 418 to the packet data network 306 via the gateway 413 of the visited mobile network 406; and transmit internet protocol packets over the established connection 416, 418.

Clause 18. The mobile device of clause 17, wherein the connection name comprises an access point name (APN), data network name (DNN), or slice identifier.

Clause 19. The mobile device of clauses 17 and 18, wherein the packet data network comprises a tunnel to a private corporate network.

Clause 20. The mobile device of clauses 17-19, wherein, the mobile device connects to the home mobile network using a connection setting pre-loaded into the SIM profile by a SIM card manufacturer or by a mobile network operator of the home mobile network.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for enabling an expedited selection of a gateway used by a computing device to connect to a packet data network, the method comprising:
  establishing a first connection between the computing device and the packet data network via a first gateway, wherein the first gateway is selected by a mobile network based on a first connection name provided by the computing device when establishing the first connection;

receiving, over the first connection, a connection setting from the mobile network, wherein the connection setting includes a second connection name associated with a second gateway, and wherein the second connection name is assigned by the mobile network to a subscriber identity module (SIM) profile used by the computing device;

storing the connection setting including the second connection name in the SIM profile, the storage of the second connection name in the SIM profile enabling the computing device to select and communicate with the packet data network via the second gateway;

selecting the second gateway by sending a connection request that includes the second connection name to the mobile network, causing the mobile network to establish a second connection with the packet data network via the second gateway; and using the second connection to communicate with a destination device over the packet data network via the second gateway.

2. The method of claim 1, wherein the connection setting is stored in a file on the SIM profile.

3. The method of claim 1, wherein the connection setting is stored in a profile metadata of the SIM profile.

4. The method of claim 2, wherein the connection setting is appended to a list of connection settings stored in the file on the SIM profile.

5. The method of claim 2, wherein the file on the SIM profile comprises an elementary file of a SIM profile file system.

6. The method of claim 1, wherein the connection setting includes a connection type and one or more connection properties, wherein the one or more connection properties include the second connection name, an internet protocol (IP) type indicating whether to create an IPv4 or IPv6 type connection, or a secondary authorization protocol used when connecting to the packet data network.

7. The method of claim 6, wherein the connection type indicates whether the connection is for the internet, voice of internet protocol, internet protocol multimedia subsystem, or mobile network operator provisioning.

8. The method of claim 1, wherein the connection setting is received in response to an indication that the mobile device has roamed to a visited network, or wherein the first connection is an initial connection of the computing device to the mobile network, and wherein the connection setting is received in response to the initial connection of the computing device to the mobile network.

9. The method of claim 1, further comprising:
receiving an indication of a connection type;
querying a plurality of connection settings stored in the SIM profile based on the received connection type to identify a connection name associated with the received connection type; and wherein the connection request includes the connection name associated with the received connection type.

10. A computing device comprising:
a memory storing thereon instructions that when executed by a processor of the computing device cause the computing device to perform operations comprising:
attaching to a mobile network;
establishing a first connection over a packet data network using a first connection name property of a first connection setting that was pre-loaded onto a subscriber identifier module (SIM) card of the computing device;
using the established first connection, receiving a second connection setting from the mobile network, wherein the second connection setting includes a second connection name and a profile ID, wherein the second connection name is associated with a second gateway, wherein the profile ID is associated with a SIM profile stored on the SIM card, and wherein the second connection name and the profile ID associate the SIM profile with the second gateway;
storing the second connection setting including the second connection name in the SIM profile, the storage of the second connection name in the SIM profile enabling the computing device to select and communicate with the packet data network using the second gateway;
sending a request to the mobile network to establish a second connection over the packet data network, wherein the request includes the second connection name, and wherein the request causes the mobile network to establish the connection between the computing device and the packet data network via the second gateway; and
using the second connection to communicate with a destination device over the packet data network via the second gateway.

11. The computing device of claim 10, wherein the second connection setting includes a connection type and a visited network identifier.

12. The computing device of claim 11, wherein the connection type indicates that the second connection is for internet access, voice over internet protocol communication, internet protocol multimedia subsystem, or mobile network operator provisioning.

13. The computing device of claim 10, wherein the second connection is established without manual entry of connection properties and without downloading connection properties using a different networking technology.

14. The computing device of claim 10, wherein the second connection setting includes connection properties including the second connection name, whether to use an internet protocol (IP) v4 or an IPv6 connection, whether the second connection will use a proxy, or whether the second connection will use a secondary authentication protocol.

15. The computing device of claim 10, wherein the second connection setting is received in response to connecting to a visited network, in response to the computing device migrating to a different mobile network operator, or in response to the SIM card being moved to a different type of device.

16. The computing device of claim 10, further comprising:
storing the second connection setting in a collection of connection settings within a profile of the SIM card; and
querying the collection of connection settings based on a connection type, wherein the second connection name sent with the request to establish the second connection comprises a result of the query.

17. A mobile device configured to communicate with one or more mobile networks, the mobile device configured to:
connect to a home mobile network;
subsequent to connecting to the home mobile network, connect to a visited mobile network;
cause an indication that the mobile device connected to the visited mobile network to be transmitted to the home mobile network;

in response to receiving the indication that the mobile device connected to the visited mobile network, receive a connection setting from the home mobile network that includes a connection name of a gateway of the visited mobile network and receive a profile ID that identifies a subscriber identifier module (SIM) profile stored on the mobile device;

store the connection setting in the SIM profile identified by the received profile ID, the storage of the connection name in the SIM profile enabling the mobile device to select and communicate with a packet data network using the gateway of the visited mobile network;

send a request including the connection name to the visited mobile network to establish a connection to the packet data network via the gateway of the visited mobile network; and transmit internet protocol packets over the established connection.

18. The mobile device of claim 17, wherein the connection name comprises an access point name (APN), data network name (DNN), or slice identifier.

19. The mobile device of claim 17, wherein the packet data network comprises a tunnel to a private corporate network.

20. The mobile device of claim 17, wherein, the mobile device connects to the home mobile network using a connection setting pre-loaded into the SIM profile by a SIM card manufacturer or by a mobile network operator of the home mobile network.

* * * * *